US010272383B2

(12) United States Patent
Von Der Heide

(10) Patent No.: US 10,272,383 B2
(45) Date of Patent: Apr. 30, 2019

(54) METHOD AND APPARATUS FOR DYNAMIC EXHAUST-GAS TREATMENT

(71) Applicant: Mehldau & Steinfath Umwelttechnik GmbH, Essen (DE)

(72) Inventor: Bernd Von Der Heide, Essen (DE)

(73) Assignee: Mehldau & Steinfath Umwelttechnik GmbH, Essen (DE)

( * ) Notice: Subject to any disclaimer, the term of this patent is extended or adjusted under 35 U.S.C. 154(b) by 0 days.

(21) Appl. No.: 15/569,983

(22) PCT Filed: Jan. 29, 2016

(86) PCT No.: PCT/EP2016/051899
§ 371 (c)(1),
(2) Date: Oct. 27, 2017

(87) PCT Pub. No.: WO2016/173730
PCT Pub. Date: Nov. 3, 2016

(65) Prior Publication Data
US 2018/0154305 A1    Jun. 7, 2018

(30) Foreign Application Priority Data

Jul. 17, 2015 (DE) .................. 10 2015 009 089

(51) Int. Cl.
*B01D 53/56* (2006.01)
(52) U.S. Cl.
CPC ...... *B01D 53/56* (2013.01); *B01D 2251/2062* (2013.01); *B01D 2251/2067* (2013.01); *B01D 2257/404* (2013.01)

(58) Field of Classification Search
CPC ............ B01D 53/56; B01D 2251/2067; B01D 2251/2062; B01D 53/74; B01D 53/79; B01D 2257/402; B01D 2257/404; B01D 2258/0283
See application file for complete search history.

(56) References Cited

U.S. PATENT DOCUMENTS

| 4,115,515 A * | 9/1978 | Tenner | B01D 53/56 423/235 |
| 4,328,020 A * | 5/1982 | Hughes | B01D 53/56 423/235 |
| 4,777,024 A * | 10/1988 | Epperly | B01D 53/34 423/235 |
| 5,676,071 A * | 10/1997 | Horler | B01D 53/30 110/190 |
| 7,886,539 B2 * | 2/2011 | Cai | F23R 3/346 60/732 |
| 9,869,226 B2 * | 1/2018 | Broderick | F01N 3/208 |
| 2005/0008555 A1 * | 1/2005 | Hsieh | B01D 53/56 423/235 |
| 2017/0362983 A1 * | 12/2017 | Nilsson | F01K 23/06 |
| 2018/0274779 A1 * | 9/2018 | Valentine | F23J 15/003 |

FOREIGN PATENT DOCUMENTS

| DE | 10 2009040111 | * 3/2011 | ............ F01N 11/002 |
| WO | WO 91 17814 A1 | * 11/1991 | ............ B01D 53/56 |

* cited by examiner

*Primary Examiner* — Timothy C Vanoy
(74) *Attorney, Agent, or Firm* — Edward E. Sowers; Brannon Sowers & Cracraft PC

(57) ABSTRACT

The present invention relates to a method and a device for the treatment of nitrogen oxide-containing exhaust gases from technical processes, such as flue gases, for the purpose of reducing the nitrogen oxide content by way of a chemical reduction of the nitrogen oxides.

10 Claims, 2 Drawing Sheets

METHOD AND APPARATUS FOR DYNAMIC EXHAUST-GAS TREATMENT

CROSS-REFERENCES TO RELATED APPLICATIONS

This application is a National Stage filing of International Application PCT/EP 2016/051899, filed Jan. 29, 2016, "Method and Apparatus for Dynamic Exhaust-Gas Treatment", claiming priority to DE 10 2015 005 459.7 filed Apr. 30, 2015, and to DE 10 2015 009 089.5 filed Jul. 17, 2015. The subject application claims priority to PCT/EP 2016/051899, to DE 10 2015 005 459.7, and to DE 10 2015 009 089.5, and incorporates all by reference herein, in their entirety.

BACKGROUND OF THE INVENTION

The present invention relates to the technical field of the treatment of exhaust gases, in particular the treatment of nitrogen oxide-containing exhaust gases.

The present invention relates in particular to a method for the treatment of nitrogen oxide-containing exhaust gases from technical processes, such as flue gases, for the purposes of removing and/or separating off the nitrogen oxides and/or for the purposes of reducing the nitrogen oxide content with chemical reduction of the nitrogen oxides. In particular, the present invention relates to a method for the denitrification of exhaust gases from large technical installations, such as for example power plants, in particular combined heat and power plants, or waste incineration installations.

Furthermore, the present invention relates to an apparatus for the treatment of nitrogen oxide-containing exhaust gases from technical processes, such as flue gases, for the purposes of removing and/or separating off the nitrogen oxides or else for the purposes of reducing the nitrogen oxide content by means of chemical reduction of the nitrogen oxides.

Furthermore, the present invention relates to the use of an apparatus for removing and/or separating off nitrogen oxides from nitrogen oxide-containing exhaust gases from technical processes, in particular flue gases.

In the case of combustion reactions in the presence of air, metastable, generally poisonous and reactive oxides of nitrogen, so-called nitrogen oxides, are formed. The formation of nitrogen oxides is intensified by the combustion or thermolysis and pyrolysis of organic and inorganic nitrogen-containing compounds, such as occur in large combustion installations such as combined heat and power plants or waste incineration installations.

Nitrogen oxides, in particular the compounds nitrogen monoxide and nitrogen dioxide, which are known under the designation "nitrous gases" and which are also referred to for short as $NO_x$, are however not only poisonous and lead to irritation and damage to the respiratory organs, but also promote the formation of acid rain, as they react with moisture to form acids.

The release of nitrogen oxides is however also a problem for additional environmental protection reasons, as they firstly promote the formation of smog and hazardous ground-level ozone and secondly, as greenhouse gases, intensify global warming.

Owing to the disadvantageous effects of nitrogen oxides on health and on the environment, and not least owing to the associated economic damage, it has already long been attempted to minimize or prevent the release of nitrogen oxides from combustion processes. In passenger motor vehicles, this is achieved for example through the use of catalytic converters, which permit an almost complete removal of the nitrogen oxides from the exhaust gases.

To reduce the nitrogen oxide emissions from large technical installations, in particular from large industrial combustion installations, taking into consideration the respective legal situation and business considerations, various methods for denitrogenization or denitrification ($DeNO_x$) have been developed which, on their own or in combination, are intended to yield an effective reduction or elimination of nitrogen oxides in exhaust gases, in particular flue gases.

Methods or measures for reducing the nitrogen oxide content of exhaust gases, in particular flue gases, can in this case be divided into primary and secondary measures:

In the case of the primary measures, the combustion process is controlled such that the nitrogen oxide content in the resulting exhaust gases is as low as possible; the formation of the nitrogen oxides is as far as possible suppressed, or nitrogen oxides that are formed are broken down as immediately as possible, but at the latest before exiting the combustion chamber. Primary measures include, for example, flue gas recirculation, wherein the flue gas is conducted again into the combustion zone, and air and fuel stages, wherein the combustion is controlled such that different combustion zones with different oxygen concentrations are realized. Furthermore, the formation of nitrogen oxides in flue gases can also be reduced through the addition of additives or by quenching, that is to say by the injection of water for the purpose of lowering the temperature during the combustion process.

By contrast to the primary measures, which are intended to prevent the formation of nitrogen oxides, the concentration of the nitrogen oxides in the exhaust gases, in particular flue gases is reduced through the use of the secondary measures. Secondary measures include for example separation methods, in which the nitrogen oxides are chemically bound or scrubbed out of the flue-gas flow. A disadvantage of the separation methods is however that large amounts of waste products are generated, such as for example process water, which are often contaminated with further flue gas constituents and must be disposed of in a costly manner.

Therefore, in modern large technical installations, as secondary measures, use is normally made of methods which are based on a reduction of the nitrogen oxides to form elementary nitrogen and which produce only small amounts of waste substances, wherein a distinction is generally made between catalytic and non-catalytic methods.

The selective catalytic reduction (SCR) of nitrogen oxides encompasses catalytic methods in which the nitrogen oxides are converted to form elementary nitrogen with the aid of metal catalysts. With SCR methods, it is generally possible to attain the best denitrification values, although the use of the catalyst makes the method considerably more expensive and less economically viable.

Furthermore, installations for carrying out the SCR method are extremely expensive not only in terms of purchase but also in terms of maintenance, as the sensitive catalytic converters must undergo maintenance, or be replaced, at short time intervals. Specifically in the case of large combustion installations in which the fuel composition can often be determined only with inadequate accuracy, such as for example waste incineration installations, there is therefore always the risk of poisoning of the catalytic converters by contaminants in the flue gas. This risk can be reduced only through the implementation of additional expensive measures.

By contrast, selective non-catalytic reduction (SNCR) is based on the thermolysis of nitrogen compounds, in particular ammonia or urea, which then react with the nitrogen oxides in a comproportionation reaction to form elementary nitrogen.

Selective non-catalytic reduction can be carried out at considerably lower cost than selective catalytic reduction: the costs for the purchasing and maintenance of SNCR installations amount to just 10 to 20% of the costs of corresponding SCR installations.

A problem of the SNCR method is however that the effectiveness thereof does not come close to matching the effectiveness of catalytic methods, such that, for example in the event of a further reduction of the legally permitted limit values for nitrogen oxides in exhaust gases, in particular flue gases, most SNCR installations would no longer be allowed to continue operating.

A further disadvantage of the methods based on the selective non-catalytic reduction of nitrogen oxides is that excess reducing agent must be used, which reducing agent does not react completely, such that the exhaust gas contains a certain and in some cases not insignificant amount of ammonia. Excess ammonia in the exhaust gas must either be separated off, or reduced in terms of content by process engineering measures, so as to enable the exhaust-gas flow to be released to the environment.

Furthermore, there are also methods which are based both on a catalytic effect and on the use of reducing agents, though in the case of these methods, too, the main disadvantages of the respective methods (high costs for the use of catalytic methods, and low effectiveness for the use of reducing agents) cannot be overcome.

Of late, novel SNCR installations and SNCR methods have been developed which are based on the combined use of multiple reducing agents and which exhibit effectiveness equivalent to that of catalytic methods, but such installations and methods however cannot provide optimum results at all times under all operating conditions.

For example, the temperatures required for SNCR methods, which lie in the range from 900 to 1050° C., are often disadvantageous because such high temperatures necessitate a treatment or denitrification of the flue gases before the flue gas enters the region of the heat exchangers. As a result, in particular in the case of combustion boilers being retrofitted with SNCR installations and during the operation of combustion boilers under full load, it is often the case that an injection of the reducing agent in a temperature range expedient for the SNCR method is not possible owing to the design of the boiler, or the temperatures that are expedient for the reduction are attained in the region of the heating surfaces or heat exchangers. In these cases, a major part of the flue gases, which may amount to up to 50% of the flue gas volume, often cannot be reached by the reducing agent, or the reducing agent must be introduced into the exhaust-gas flow in an unfavorable temperature range. Furthermore, with the use of urea as reducing agent, there is, in the region of the heat exchangers, the risk of deposition of ammonia or ammonium salts and thus of corrosion.

The introduction or injection of the reducing agent into the flue-gas flow in the optimum temperature range is however critical for the effectiveness of the nitrogen oxide reduction and thus for the efficiency of the denitrification.

With the injection of the reducing agent above 1100° C., the reducing agent is increasingly oxidized to form nitrogen oxides, whereby firstly the nitrogen oxide rate of separation decreases and, secondly, the consumption of reducing agent increases. By contrast, if injection is performed at excessively low temperatures, the reaction rate decreases, whereby so-called ammonia slippage occurs which results in the formation of ammonia or ammonium salts. This gives rise to secondary problems such as, for example, contamination of the fly ash with ammonia or ammonium salts, the amount of which is considerably increased, and the disposal of which is cumbersome and thus expensive. Furthermore, stringent legal limit values apply to the ammonia content of the purified exhaust gas, in order to as far as possible prevent damage to the environment.

Also, operationally induced temperature gradients in the boiler, that is to say large temperature differences and different flow speeds in a plane perpendicular to the flow direction of the exhaust gases, have the effect that the reducing agents are not distributed uniformly over the entire boiler cross section. It is thus always the case that reducing agents are injected into flue gas regions which lie outside the effective temperature window or range. This in turn results in inadequate nitrogen oxide reduction, high reducing agent consumption, and a high level of ammonia slippage.

To compensate temperature gradients and shift the temperature window for the reduction of the nitrogen oxides by means of the SNCR method into the region upstream of the heat exchangers even at full load of the boiler, methods have been developed in which water is injected into the flue-gas flow in order to cool the latter. Good results can be obtained in particular by means of a selective, that is to say spatially and temporally limited, addition of water into the flue-gas flow.

The injection of water for cooling the flue gases offers the great advantage inter alia that it is often possible to dispense with cumbersome and expensive boiler conversions if the flue gases are cooled to the preferred reaction temperature of the reducing agent before said flue gases enter the heat exchanger. This however has the major disadvantage that, depending on flue-gas temperatures and operating hours in which the boiler is operated in the upper load range, the boiler efficiency is impaired owing to water evaporation in the flue gas.

The efficiency of the heat exchangers and thus of the energy recovery, for example in combined heat and power plants, is consequently considerably reduced. For example, the loss arising from an injection of water as coolant in the context of the SNCR method is up to 3 MW in the case of a 225 MW combined heat and power plant alone, which illustrates the extent to which cooling of the exhaust gases reduces the efficiency of the power plant as a whole. For this reason, too, it is always sought to minimize the quantity of water introduced into the flue-gas flow during the implementation of the SNCR method.

An exacerbating factor in the denitrification of exhaust gases, in particular of flue gases, is furthermore that the exhaust-gas flow is not homogeneous, but rather has different temperatures, different gas speeds and different concentrations of exhaust gases at different locations and is subject to intense fluctuations over time. Owing to these chaotic and constantly changing conditions, incorrect dosing of the reducing agent into the exhaust-gas flow commonly occurs during the implementation of the denitrification method, in particular of the SNCR method, such that either the ammonia slippage is increased or the effectiveness of the method is reduced.

Furthermore, there has hitherto been no concept available for enabling the introduction of cooling water and reducing agent to be adapted promptly, preferably simultaneously, to the quickly changing conditions in the flue-gas flow.

It would therefore be desirable to have available an SNCR method which makes even greater allowance for the abovementioned points than the hitherto known methods from the prior art, and which makes it possible to considerably reduce the consumption of cooling water and reducing agent, wherein, at the same time, the ammonia slippage is further considerably reduced.

BRIEF SUMMARY OF THE INVENTION

The present invention is therefore based on the object of providing a method and an apparatus or installation for the treatment of nitrogen oxide-containing exhaust gases from technical processes, such as flue gases, for the purposes of removing and/or separating off the nitrogen oxides and/or for the purposes of reducing the nitrogen oxide content, by means of chemical reduction of the nitrogen oxides, wherein it is the intention for the abovementioned problems and disadvantages that are encountered in conjunction with the prior art to be at least substantially eliminated or at least lessened.

In particular, it is an object of the present invention to provide a method which provides a more exact dosing of reducing agents and possibly cooling water in the optimum temperature range or the optimum temperature window for the removal and/or reduction of the nitrogen oxides from the flue gas, such that the required total water quantity and the reducing agent consumption is limited to a minimum and no or only little ammonia slippage occurs.

In particular, it is an object of the present invention to provide an apparatus or installation suitable for carrying out the above-stated methods, by means of which apparatus or installation exhaust gases from large technical installations can be denitrified, wherein the method and the apparatus or installation should be flexible in terms of use, and in particular are also suitable for retrofitting to existing combustion boilers, and which apparatus or installation attain the efficiency of selective catalytic reduction but with a cost outlay similar to that for conventional selective non-catalytic reduction.

The object presented above is achieved according to the invention by means of a method as described herein; the method that refer back thereto relates to further advantageous refinements and configurations of the method according to the invention.

A further subject of the present invention is an apparatus or installation as further described herein; the apparatus descriptions that refer back thereto relate to advantageous refinements and configurations of this aspect of the invention.

Finally, a yet further subject of the present invention is the use of the apparatus according to the invention as also described.

It is self-evident that special aspects, features, configurations and embodiments and advantages or the like which—to avoid unnecessary repetition—are discussed below only with regard to one aspect of the invention self-evidently also apply correspondingly in relation to the other aspects of the invention, without this having to be explicitly mentioned.

Furthermore, it is self-evident that, where values, numbers and ranges are specified below, such value, number and range specifications are not to be regarded as limiting; it is self-evident to a person skilled in the art that, in individual cases or depending on the application, the specified ranges or specifications may be deviated from without departing from the scope of the present invention.

Furthermore, all value or parameter specifications or the like mentioned below may basically be ascertained or determined using standardized or explicitly specified determination methods, or else using determination methods that are familiar per se to an expert in this field.

On this basis, the present invention will be described in more detail below.

DETAILED DESCRIPTION OF THE INVENTION

Figure 1:
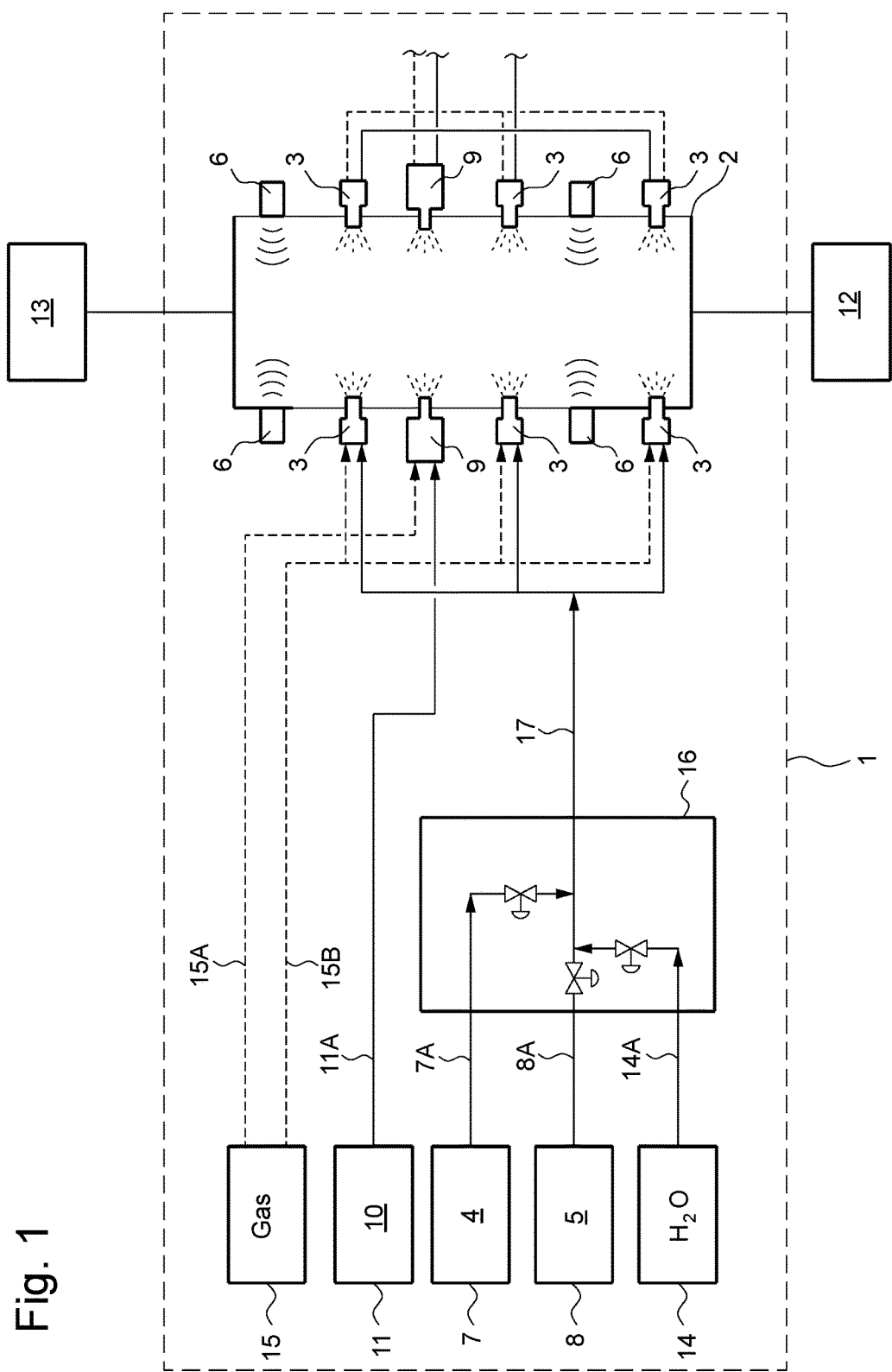
FIG. 1 is a schematic illustration of the apparatus according to the invention for carrying out a method according to the invention.

The subject of the present invention—according to a first aspect of the present invention—is thus a method for the treatment of nitrogen oxide-containing exhaust gases from technical processes, such as flue gases, for the purposes of removing and/or separating off the nitrogen oxides and/or for the purposes of reducing the nitrogen oxide content, in particular a method for the denitrification of exhaust gases from large technical installations, by means of chemical reduction of the nitrogen oxides, wherein at least one nitrogen-containing reducing agent is introduced into the flow of the nitrogen oxide-containing exhaust gases, wherein the quantity of the reducing agent introduced into the exhaust-gas flow is adjusted in a manner dependent on the exhaust-gas speed, in particular flue-gas speed.

As has surprisingly been found, improved regulation, which in particular exhibits considerably faster reactions and is more sensitive, of denitrification methods on the basis of the chemical reduction of nitrogen oxides can be performed if the exhaust-gas speed, in particular the flue-gas speed, is taken into consideration in the control of the quantity of reducing agent introduced into the exhaust-gas flow. This applies in particular for the situation in which the introduction of the reducing agent is spatially and temporally limited, that is to say so-called temperature-dependent individual lance switching is implemented, in the case of which only single-nozzle devices or lances for introducing the reducing agent into the flue-gas flow are activated, which inject into the temperature range optimal for the reduction of the nitrogen oxides.

In the context of the present invention, adaptive dynamic flue-gas treatment is made available, which can be adapted in a highly flexible manner, and with short reaction times, to the respective conditions of the exhaust-gas flow, in particular of the flue-gas flow.

The exhaust-gas speed, in particular the flue-gas speed, is suitable as a parameter for the control of the denitrification of exhaust gases, in particular flue gases, because the exhaust-gas speed correlates with the $NO_x$ load (nitrogen oxide load) of the exhaust-gas flow. In particular, the product of speed of the exhaust-gas flow and the nitrogen oxide concentration is proportional to the $NO_x$ load. As has now been found, considerably improved control of the denitrification method as a whole can be achieved by means of a determination of the speeds, in particular a determination of the relative speeds, of the exhaust-gas flow.

In the context of the methods for the denitrification of flue gases by means of chemical reduction performed in the prior art, the quantity of injected reducing agent is set by means of the load signal and is controlled by means of a comparison of the nitrogen oxide content of the gas obtained downstream of the exhaust-gas treatment, the so-called purified gas, and a setpoint value. Through this type of control, the result of the exhaust-gas treatment performed can however be assessed only three to five minutes after the exhaust-gas treatment has actually been performed, such that process control on the basis of such data does not correspond to the present conditions in the exhaust-gas flow, but rather reacts to the conditions in the exhaust-gas flow that prevailed there three to five minutes previously.

Furthermore, said type of control does not allow for the inhomogeneity of the flue-gas flow with in particular different flue-gas speeds. In the context of the present invention, therefore, an adaptive flue-gas treatment is provided which detects the conditions in the flue-gas flow in real time and permits simultaneous control in a manner dependent on the measured parameters.

In particular, in the context of the present invention, in relation to methods from the prior art, it is possible on the basis of the novel adaptive method implementation
(a) to reduce the ammonia slippage by 20 to 30%,
(b) to likewise reduce the reducing agent consumption by 20 to 30%, and
(c) to reduce the water consumption by up to 75%, but at least by 25 to 35%.

The exhaust-gas flow from technical processes, in particular a flue-gas flow, is not homogeneous, but is rather subject to intense spatial and temporal fluctuations with regard to temperatures, exhaust-gas speeds and concentrations of the exhaust gases, that is to say the abovementioned parameters change over time at a fixed point in the exhaust-gas flow, wherein, at the same time, differences also exist between different locations in the exhaust-gas flow. In the case of the hitherto known methods, the inhomogeneity and the fluctuations of the exhaust-gas flow are allowed for only to an insufficient degree; at best, only temperature fluctuations are incorporated into the control of the denitrification. Such control is however very inaccurate, because allowance is not made for the fact that different nitrogen oxide concentrations and flue-gas speeds prevail in different regions of the exhaust-gas flow. The flue-gas speed however correlates with the $NO_x$ load. In the context of the known methods for the denitrification of flue gases, therefore, the different exhaust-gas speeds lead, in the case of equal nitrogen oxide concentrations in the exhaust-gas flow and equal reducing agent quantity, to overdosing and thus greater ammonia slippage in the region with low flue-gas speed. To avoid overdosing, which in turn results in the exhaust gases being laden with ammonia—so-called ammonia slippage—or ammonium salts, it is necessary either to stop the introduction of the reducing agent, or reduce the reducing agent quantity, in such regions.

Ammonia slippage can occur only if the flue-gas temperature is too low or overdosing is performed in the optimum temperature range. In the presence of excessively high temperatures, no slippage or only little slippage occurs, because the reducing agent is burned to form nitrogen oxides, which however in turn reduces the effectiveness of the denitrification method and increases the reducing agent consumption.

In the presence of excessively low temperatures, the ammonia slippage that occurs at excessively cold locations can be avoided by virtue of the corresponding injection devices, in particular the injection lances, for introducing the reducing agent being switched such that injection is performed into a region with relatively high temperatures. In this way, it is also firstly the case that a higher separation efficiency and at the same time low reducing agent consumption are achieved, but it is often the case that complete mixing of exhaust gas and reducing agent is not achieved, such that the effectiveness of the denitrification is reduced.

If the injection is not possible in a region with relatively high temperature, the ammonia slippage of the exhaust-gas flow as a whole may also be reduced by interrupting the injection at the location at which the ammonia slippage occurs, as long as the temperature does not lie in the optimum range. This however has the result that the overall efficiency decreases, and the reducing agent consumption increases, because the reducing agent distribution is no longer homogeneous over the entire cross section of the exhaust-gas flow. Better results can thus be achieved if less reducing agent is introduced into the exhaust-gas flow at the locations at which the exhaust-gas speed is lower.

There are no hitherto known methods for controlling denitrification methods, in particular SNCR methods, which are based on control of the method on the basis of the exhaust-gas speed. The fact that such a method has not hitherto been considered is based in particular on the fact that a measurement of the exhaust-gas speeds, in particular of the flue-gas speeds, practically cannot be realized, in particular cannot be realized in large technical installations under normal operating conditions, owing to the high exhaust-gas temperatures of approximately 1000° C.

It has however been found that, by means of suitable temperature measurements, sufficient information regarding the flue-gas speeds, in particular spatially resolved information, can be obtained, which information makes it possible to ensure considerably more flexible and faster control of the denitrification method.

Surprisingly, from the temperature data, it is also possible during the execution of the denitrification method for data to be continuously obtained which allow conclusions to be drawn regarding the flue-gas speed. The method according to the invention thus permits continuous adaptive and dynamic control of the denitrification.

In the context of the present invention, it is normally provided that the exhaust-gas flow is conducted in at least one flow direction, in particular through a reactor. The reactor for the execution of the method according to the invention is normally the connection between the combustion boiler itself and the heat exchangers, because the method according to the invention is preferably executed in said region. The exhaust gases, in particular the flue gases, are conducted through the reactor or through the connection between combustion boiler and heat exchangers, whereby a flow direction of the exhaust gases is realized.

In general, it is provided that, for the ascertainment and/or determination of the exhaust-gas speed, a temperature profile and/or a temperature gradient of the exhaust-gas flow is established in particular at least in regions.

In this context, it has proven to be advantageous if the speed, in particular the relative speed, of the exhaust-gas flow is determined on the basis of the temperature profile and/or of the temperature gradient of the exhaust-gas flow.

Specifically, it has surprisingly been found that, by means of temperature data, in particular through the determination of temperature profiles and temperature gradients within the exhaust-gas flow, it is possible for sufficient information to be obtained which permits conclusions to be drawn regarding the speeds of the exhaust-gas flow.

The method according to the invention is particularly advantageous inter alia because it has surprisingly been found that a determination of the absolute speeds of the exhaust-gas flow—which practically cannot be performed—is not required in order to adaptively regulate the denitrification method. Rather, it has been found that a determination of the relative speeds, that is to say of the relative speeds of the exhaust gases in different regions of the exhaust-gas flow with respect to one another, is entirely sufficient for considerably improving the efficiency of the denitrification method as a whole, as discussed above, and for considerably reducing the ammonia slippage, the water consumption and the reducing agent consumption.

It has surprisingly been found that, even during the execution of the denitrification method, that is to say during the introduction of reducing agents and cooling water into the exhaust-gas flow, the ascertained temperature profiles and/or temperature gradients of the exhaust-gas flow can be used to determine the relative speed of the exhaust gases. This is based inter alia on the fact that, in the case of the introduction of cooling water and/or aqueous solutions of reducing agents into the exhaust-gas flow with a known location of the introduction, the cooling action can be determined, and consequently, the flue-gas speed can be inferred from the measured cooling of the flue-gas flow between two measurement points or regions: since relatively hot exhaust gas, in particular flue gas, exhibits relatively great impetus and relatively slow-flowing exhaust gas is cooled more intensely at the boiler walls and/or in the heat exchangers, relatively intense cooling between the individual measurement regions is indicative of a slower flue-gas speed than between the measurement regions in which the cooling is less pronounced. On the basis of the information thus obtained, it is possible to obtain spatially resolved temperature profiles and/or temperature gradients, which allow statements to be made regarding the relative flue-gas speeds. The information thus obtained then serves as a basis for regulating the supply of reducing agent into the flue-gas flow.

In the context of the present invention, particularly good results are obtained if, for the ascertainment of the temperature profile and/or of the temperature gradient of the exhaust-gas flow, the temperatures of the exhaust-gas flow in planes, in particular in preferably parallel, in particular parallel and mutually aligned planes (that is to say planes which are in alignment), in each case perpendicular to the flow direction of the exhaust gases, are ascertained.

In particular, in the context of the present invention, it has proven to be expedient if, in the exhaust-gas flow, in particular in each case planes of sections, that is to say in particular measurement regions, are defined in each case perpendicularly with respect to the flow direction of the exhaust gases. In this context, it may be provided that the planes of the sections extend in each case perpendicularly with respect to the flow direction of the exhaust gases and/or parallel to one another.

In the context of the present invention, it is preferable if the planes of the sections are, in the flow direction of the exhaust gases, arranged vertically one above the other and in alignment with one another and/or arranged following one another and in alignment with one another. In the context of the present invention, therefore, the cross section of the exhaust-gas flow (in particular perpendicularly with respect to the flow direction of the exhaust gases) is divided into sections, wherein planes of sections, which planes lie one above the other, are oriented so as to be in alignment with one another, that is to say so as to be arranged exactly directly one above the other and so as to define three-dimensional regions, preferably cuboids. This is however the case only to the extent permitted by the construction of the reactor, in particular of the boiler. It is crucial that sections of the planar cross sections of the exhaust-gas flow can always be correlated with one another, that is to say the measured flue-gas temperature in one region at the time x can be correlated with the flue-gas temperature in a region situated thereabove at the time y.

Particularly good results are obtained in this context if the exhaust-gas temperature is determined in each case in the respective planes, in particular in the different sections of the respective planes, and in that, on the basis of the determined exhaust-gas temperatures of the respective planes, in particular of the different sections of the respective planes, temperature profiles and/or temperature gradients in the exhaust-gas flow, in particular temperature profiles and/or temperature gradients of sections which are arranged vertically one above the other and in alignment with one another, and/or which follow one another and are in alignment with one another, in each case in the flow direction, in the respective planes are determined.

In the context of the method according to the invention, therefore, it is preferably the case that, perpendicularly with respect to the flow direction of the exhaust gases, in particular of the flue gases, the temperatures of the exhaust-gas flow in the respective measurement planes which follow one another in the flow direction of the exhaust gases are determined, and the planes are subsequently divided into sections, wherein the division in the respective planes preferably corresponds to one another, such that the sections of planes which follow one another can be correlated with one another and define three-dimensional regions which extend axially with respect to the flow direction of the exhaust gases and have in each case two sections as base surfaces.

Owing to the respective construction of the boilers or combustion chambers, it may be possible that not all sections can be correlated with one another. The method according to the invention can however be executed even if a predominant part of sections of planes which follow one another can be correlated with one another, wherein, however, the efficiency of the method is reduced in relation to a correlation of all sections of planes which follow one another. Through the determination of the exhaust-gas temperatures in the planes perpendicular to the flow direction of the exhaust gases, it is possible to determine a temperature profile of the exhaust gases and in particular also temperature gradients between the individual planes, in particular between the respective correlated sections.

In the context of the present invention, it is preferably provided that, on the basis of the temperature profiles and/or of the temperature gradients in the exhaust-gas flow, the speed, in particular the relative speed, of the exhaust gases is determined.

As already stated above, it has surprisingly been found that, for particularly flexible and adaptive process regulation, which adapts to the rapidly changing conditions in the exhaust-gas flow, it is sufficient to determine the relative speeds in the exhaust-gas flow. An exhaust-gas flow is neither homogeneous nor uniform, but is rather a turbulent, chaotic and constantly changing entity. Within the exhaust-gas flow, the concentrations of the exhaust gases, the temperatures and the exhaust-gas speeds deviate greatly from one another.

The method according to the invention however provides a possibility for determining the relative exhaust-gas speeds within the exhaust-gas flow on the basis of a determination of temperature profiles and/or temperature gradients of the exhaust-gas flow, in order to thereby adapt the quantity of reducing agent introduced in an adaptive manner and simultaneously with respect to the respective conditions prevailing in the exhaust-gas flow.

The determination of the texture profiles and/or temperature gradients of the exhaust-gas flow furthermore makes it possible to more exactly dose not only generally the quantity of the introduced reducing agent but also the locations at which the reducing agent is introduced into the exhaust-gas flow. In the method hitherto known from the prior art, the regulation of the introduced reducing agent quantity is performed exclusively by means of the load signal and the determination of the nitrogen oxide content of the purified gas obtained downstream of the exhaust-gas treatment. This type of control and/or regulation is however very inert because, in particular, the clean-gas values are normally available only 3 to 5 minutes after the exhaust-gas treatment, and process regulation on the basis of such values cannot take into consideration the present nitrogen oxide load in the exhaust gas. Furthermore, the control by means of the load signal and into the clean-gas values of the exhaust gases does not allow any statements to be made regarding what quantities of reducing agent have to be injected at which locations of the exhaust-gas flow. The method of the prior art results in instances of overdosing and underdosing, which either considerably reduce the efficiency of the denitrification method or lead to increased ammonia slippage.

As regards the number of planes used in the context of the method according to the invention for the ascertainment of the temperature profiles and/or of the temperature gradients, said number may naturally vary in wide ranges in a manner dependent on the respective conditions. Particularly good results are however obtained if, for the ascertainment of the temperature profiles and/or of the temperature gradients, the temperatures of the exhaust-gas flow in at least 2 planes, in particular 2 to 10 planes, preferably 2 to 5 planes, preferably 2 or 3 planes, particularly preferably 2 planes, are ascertained. In the context of the method according to the invention, for the ascertainment of authoritative temperature profiles and of the temperature gradients, at least two planes are required in order to be able to determine the temperature gradients and/or temperature differences, which are relevant for the method according to the invention, between the planes.

Normally, however, two planes suffice for the determination of the temperature profiles and/or temperature gradients of the exhaust-gas flow. It has surprisingly been found that, despite the exhaust-gas treatment—in particular the introduction of reducing agents and possibly cooling water into the exhaust-gas flow, which is preferably performed between the two planes, the temperature profiles can be determined and statements can be made regarding the exhaust-gas speeds, in particular the relative exhaust-gas speeds, which permit an adaptive method implementation.

As regards the measurement of the temperatures of the exhaust-gas flow, any suitable measurement method may be used in the context of the invention. Particularly good results are however obtained if the temperatures of the exhaust-gas flow are ascertained by means of acoustic and/or optical temperature measurement, preferably acoustic temperature measurement.

What have proven to be particularly expedient in this connection are methods for acoustic temperature measurement, in particular acoustic gas temperature measurement, by means of which the true gas temperatures can be determined, and temperature profiles calculated, over the combustion chamber cross section or the cross section of the exhaust-gas treatment device close to the injection points.

A system that is preferably used according to the invention is composed of mechanically and electrically identical emitter and receiver units, which are mounted on the walls of the exhaust-gas treatment device downstream of the combustion chamber, in particular combustion boiler, and an external control unit. During the measurement, a valve (for example solenoid valve) opens up a compressed-air line on the transmitter side, whereby acoustic signals are generated. The signals are recorded simultaneously at the emitter and receiver sides. From the digitalized signals, the propagation time can be determined. Since the distance covered is known, the speed of sound is obtained, which is converted into a temperature, the so-called path temperature. With multiple emitter/receiver units acting in combination in one plane, multi-path configurations are obtained, by means of which the two-dimensional temperature distribution in a plane can be determined immediately and without delay. By comparison of the temperature distribution of several planes, it is possible to ascertain an overall temperature profile of the exhaust gases and temperature gradients between the individual planes.

Furthermore, it is however also possible for the temperature profile to be calculated on the basis of numerical flow dynamics in real-time (online CFD, online computational fluid dynamics).

The method according to the invention, in particular the reduction of the nitrogen oxides, is generally performed in the absence of a catalyst. Thus, in the case of the method according to the invention, the high purchase and maintenance costs for a catalyst for the reduction of the nitrogen oxides are eliminated. The method according to the invention is preferably carried out as selective non-catalytic reduction, in particular as an SNCR method.

In the case of the selective non-catalytic reduction (SNCR) of nitrogen oxides, reducing agents are normally injected in aqueous solution or in gaseous form into the hot exhaust gases or flue gases. The reducing agents then react with the nitrogen oxides to form molecular nitrogen, water and carbon dioxide, as represented, based on the example of the reducing agents ammonia and urea, by means of the following reaction equations (1) and (2).

$$(NH_2)_2CO + 2NO + \tfrac{1}{2}O_2 \rightarrow 2N_2 + CO_2 + 2H_2O \quad (1)$$

$$4NH_3 + 4NO + O_2 \rightarrow 4N_2 + 6H_2O \quad (2)$$

The optimum temperature range in which a significant reduction of the nitrogen oxides is achieved normally lies in the range from 950 to 1100° C., depending on the flue gas composition. Above said temperature range, increasing amounts of ammonia are oxidized, that is to say additional nitrogen oxides form.

At temperatures below this, the rate of reaction decreases, resulting in so-called ammonia slippage which, over the course of the further flue gas path, can lead to the formation of ammonia salts or ammonium salts and thus to secondary problems such as corrosion; ammonia slippage should therefore be minimized.

Ammonia slippage is to be understood in particular to mean that part of the ammonia which does not react with the nitrogen oxides to form elementary nitrogen. The ammonia originates here either from overdosing of ammonia or is a decomposition product from the thermolysis of nitrogen-containing reducing agents, for example urea.

Also, within the context of the present invention, it is generally provided that the introduction of the reducing agent into the exhaust-gas flow is performed such that the reducing agent reacts with the nitrogen oxides, in particular reduces the nitrogen oxides, preferably to form elementary nitrogen. In the context of the present invention, the reducing agent preferably reacts with the nitrogen oxides to form elementary nitrogen by comproportionation. Owing to the comproportionation of nitrogen oxides and nitrogen-containing reducing agent to form elementary nitrogen and preferably further gaseous components, the generation of further waste, which must be disposed of in an expensive manner, is prevented.

Furthermore, in the context of the present invention, it is normally provided that the reducing agent is used in the form of an aqueous solution. In this context, particularly good results are obtained if, as reducing agent, use is made of ammonia and/or urea, in particular in the form of their aqueous solutions.

The introduction of the reducing agent into the nitrogen oxide-containing exhaust gases may be realized by means of a multiplicity of technical measures. Within the context of the present invention, it has however proven expedient for the reducing agent to be introduced, in particular sprayed or injected, in finely distributed form into the exhaust-gas flow. By means of injection in particular, it is possible to realize a fine distribution of the reducing agent with simultaneously excellent depth of penetration of the reducing agent into the exhaust-gas flow or flue-gas flow, permitting particularly effective reduction of the nitrogen oxides.

In this case, it has proven advantageous for the reducing agent to be introduced into the exhaust-gas flow by means of injection devices, in particular injection lances. The pressure required for injection is in this case normally generated by means of compressed air or steam.

In this case, it may be the case that each injection device has one or more, in particular 1 to 20, preferably 1 to 15, preferably 1 to 10, particularly preferably 1 to 5, nozzles for introducing the reducing agent into the exhaust-gas flow. Particularly fine and uniform distribution of the reducing agent in the exhaust-gas flow is realized by means of a multiplicity of nozzles per injection device.

Likewise, it has proven advantageous in this regard for the injection devices to be arranged in 1 to 10, in particular 1 to 7, preferably 1 to 5, injection planes. By means of the arrangement of the injection devices in injection planes, it can be ensured that the entire reactor cross section or the entire width of the flue-gas flow can be covered by the reducing agent or the reducing agents.

It may furthermore be provided that each injection plane has 1 to 20, in particular 1 to 15, preferably 1 to 12, injection devices.

In general, the reducing agent is introduced into the exhaust-gas flow by means of 1 to 200, in particular 2 to 100, preferably 5 to 60, injection devices.

In the context of the present invention, it has proven to be particularly advantageous for the injection devices for introducing the reducing agent to be controlled individually and/or in groups, preferably individually.

Particularly good results are attained if the discharge of the reducing agent from the injection devices is controlled for each injection device individually and/or for groups of injection devices. The individual injection devices are preferably regulable individually or at least in groups, as the exhaust-gas flow, in particular the flue-gas flow, is not a homogenous entity but is subject to spatial and temporal fluctuations in terms of temperature, composition and speed. Also, non-uniform temperature distributions in the flue-gas flow may arise as a result of coolant, in particular cooling water, being selectively introduced into the flue-gas flow at certain locations in order to cool the exhaust gases at these locations to a temperature range optimum for the denitrification.

To ensure particularly efficient use of the reducing agent, the injection devices are therefore advantageously regulable individually, that is to say the injection devices can advantageously be operated or deactivated individually. This so-called individual lance switching makes it possible for the reducing agent to always be injected into regions of the exhaust-gas flow, in particular of the flue-gas flow, in which optimum temperatures for the reaction of the reducing agent with the nitrogen oxides prevail.

In the context of the present invention, particularly good results are obtained if the quantity of the reducing agent introduced or to be introduced into the flue-gas flow is also individually regulable for each injection device. In this way, the advantages of the method according to the invention, which is based on a particularly flexible and adaptive method implementation based on the ascertainment of the flue-gas speeds, can be fully utilized. In this context, it is likewise advantageous if the pressure and thus the depth of penetration of the reducing agent into the exhaust-gas flow can also be regulated individually for each injection device. It is particularly advantageous if the individual injection devices can be individually regulated not only with regard to their use and the quantity of reducing agent used, but if the composition of the injected reducing agent, that is to say either individual reducing agents or mixtures thereof, can also be coordinated individually with the respective conditions.

The individual controllability of all of the injection devices with regard to their operating parameters and the composition of the reducing agent duly leads to the best results but also increases the outlay in terms of process technology and thus the costs of the denitrification.

Likewise, very good results—but with considerably lower outlay in terms of process technology—are attained if the use and the quantity of the introduced reducing agent is individually controlled for each injection device, but the composition of the reducing agent, in particular also the mixing ratio of different reducing agents, is adjusted jointly for all injection devices or is adjusted jointly at least for groups of injection devices. In this context, it has proven to be expedient if the individual injection devices can be individually regulated with regard to the further operating parameters, such as for example the pressure.

Very good results can likewise be achieved even if the injection devices are controlled in groups. In this case, a group of injection devices is to be understood to mean a defined and/or jointly actuable and/or combined unit of a multiplicity of injection devices, in particular injection lances.

Within the context of the present invention, it is normally provided that the planes of sections and/or the sections of the exhaust-gas flow are assigned individual defined injection devices for introducing the reducing agent and/or defined groups of injection devices for introducing the reducing agent. Preferably, the three-dimensional regions defined by the division of the exhaust-gas flow into sections, and the three-dimensional regions defined by the correlation of individual sections parallel to the flow direction of the exhaust gases, are assigned injection devices individually or in groups. By means of the assignment, it is firstly the case that the introduction of the reducing agent and possibly of a coolant into the exhaust-gas flow is optimized. Secondly, it is thus possible, by means of the operating parameters of the respective injection devices, in particular the known quantity of the reducing agent introduced into the exhaust-gas flow and coolant quantities, in combination with the ascertained temperature profile of the exhaust gases, to draw conclusions regarding flue-gas speed in the respective sections or in the region between the sections. The three-dimensional regions spanned by the planes of sections or sections of planes which follow one another therefore preferably correspond to the above-defined three-dimensional regions which have been defined in the ascertainment of the temperature profile of the exhaust gases.

In a preferred embodiment of the present invention, the temperature of the exhaust-gas flow at least in a plane upstream of the injection devices for introducing the reducing agent and/or in the region of the injection devices, in particular between individual injection planes, for introducing the reducing agent is determined, and the temperature of the exhaust-gas flow at least in a second plane downstream of the injection devices for introducing the reducing agent is determined. The second plane is arranged downstream of the injection devices for introducing the reducing agent and, in said plane, the temperature distribution in the exhaust-gas flow after exhaust-gas treatment has been performed, that is to say after introduction of the reducing agent and possibly a coolant into the exhaust-gas flow, is determined.

With this second plane, the temperature distribution in the exhaust-gas flow can be measured under the following conditions:
a) without injection of the reducing agent
b) with injection of the reducing agent and
c) with injection of coolant.

The further plane, previously referred to as first plane, in which a temperature distribution in the exhaust-gas flow is determined is preferably arranged upstream, that is to say before the injection of the reducing agent in the method direction, or else preferably in the region of the injection devices for introducing the reducing agent into the exhaust-gas flow. In particular, good results are obtained if said first plane in which the temperature distribution in the exhaust-gas flow is determined is arranged downstream of one or two injection planes for introducing the reducing agent. In this way, the control of a multiplicity of injection planes can be achieved with minimal measurement outlay. Within the first plane, it is thus possible for the temperature distribution in the exhaust-gas flow to be measured under the following conditions:
a) without injection of the reducing agent
b) with injection of the reducing agent.

Between the first and the second plane for the determination of the temperature distribution in the exhaust-gas flow, there may be arranged further planes for the determination of the temperature distribution in the exhaust-gas flow, in which further planes the temperature distribution in the exhaust-gas flow is determined. This is dependent on the respective construction of the combustion chamber and/or of the reactor for carrying out the method according to the invention. With the acoustic measurement methods preferably used in the context of the present invention for determining the gas temperatures, it is normally the case that sufficient information is obtained in order to control three injection planes, arranged one after the other in the flow direction of the exhaust gases, for the injection of the reducing agent.

If coolant, in particular cooling water, is also introduced into the exhaust-gas flow in addition to the introduction of the reducing agent, this is normally performed between the first and second planes in which the temperatures of the exhaust-gas flow are determined. In the region upstream of the first measurement plane, the introduction of coolants is normally not necessary or expedient because, in the presence of excessively high temperatures in said region, the injection planes for the introduction of the reducing agent into the exhaust-gas flow, which injection planes are arranged upstream of the first measurement plane for the determination of the temperature in the exhaust-gas flow, are deactivated, and the exhaust-gas treatment is performed further upstream, downstream of the first plane in which the temperature distribution in the exhaust-gas flow is determined.

With this special control, it is thus possible in all operating situations for the temperature to be measured under the influence of the injected liquids, in particular the reducing agent-water mixture and the cooling water, and for temperature gradients and consequently the flue-gas speeds to be calculated for regions situated between two measurement planes, whereby the quantity of reducing agent and cooling water can be optimized with regard to the nitrogen oxide separation and the ammonia slippage. Likewise, the switching points, that is to say the time at which individual injection devices are activated or deactivated, can also be defined very much more precisely than has hitherto been possible.

It is generally provided in the context of the present invention that the injection devices for introducing the reducing agent into the exhaust-gas flow are controlled, in particular individually or in groups, on the basis of the determined temperature profiles of the exhaust gases and the speed of the exhaust gases, in particular the ascertained temperature gradients of the exhaust gases. In the context of the present invention, it is possible on the basis of the ascertained temperature profiles of the exhaust gases and on the basis of the speed of the exhaust gases derived therefrom not only to control individual lances with regard to the respectively prevailing optimum temperature range, that is to say to activate lances in the optimum temperature range for reduction of the nitrogen oxides and to deactivate lances in non-optimum temperature ranges, but also to adapt the quantity of the introduced reducing agent to the respective local conditions in the exhaust-gas flow.

In the context of the present invention, it may furthermore be provided that the injection devices for introducing the reducing agent into the exhaust-gas flow are additionally controlled on the basis of the load signal and/or on the basis of a comparison between, on the one hand, a measured value for the residual nitrogen oxide content in the purified gas that results from the treatment and, on the other hand, a pre-defined setpoint value.

In this case, in the context of the present invention, a load signal is to be understood to mean the indication of the respective load at which a combustion device, for example a large combustion installation, in particular a combustion boiler, is operated. Here, the load corresponds to the power output by the combustion device, and is normally specified in percent, wherein full load corresponds to (100% of) the power for which the combustion device, with optimum combustion and charging, is designed.

In the context of the present invention, the basic or coarse adjustments of the method according to the invention are preferably set on the basis of the load signal and a comparison between the obtained clean-gas value and the setpoint value for the purified gas. This is an approach that has hitherto been conventional in methods of the prior art for the purposes of controlling the reducing agent quantity introduced into the exhaust-gas flow. In the context of the present invention, however, said control and/or regulation by means of the load signal and the residual nitrogen oxide content of the purified gas is preferably used only for the coarse adjustment of the exhaust-gas treatment. The fine adjustment and the adaptive dynamic method implementation, which permits a simultaneous adaptation to the conditions respectively prevailing in the flue-gas flow, are performed on the basis of the determined temperature gradients and the flue-gas speeds derived therefrom, such that the reducing agent quantity is always adapted to the conditions presently prevailing in the exhaust-gas flow. In this way, it is possible in particular to react to fluctuations in the $NO_x$ load within the exhaust-gas flow, that is to say an increased quantity of reducing agent is introduced in regions with a high $NO_x$ load and a high flue-gas speed, whereas less reducing agent is introduced into regions with a relatively slow flue-gas speed and thus a relatively low $NO_x$ load.

As regards the temperatures in which the introduction of the reducing agent into the exhaust-gas flow is performed, said temperatures may vary in wide ranges in a manner dependent on respective structural circumstances and the load of the boiler. Particularly good results are however obtained in the context of the present invention if the introduction of the reducing agent into the exhaust-gas flow is performed at temperatures in the range from 750 to 1200° C., in particular 800 to 1150° C., preferably 850 to 1100° C. A particularly rapid and complete reaction of the reducing agent with the nitrogen oxides is obtained in the above-stated ranges, wherein the temperatures are on the one hand high enough to ensure a rapid reaction and reduce the ammonia slippage and are on the other hand low enough to prevent an oxidation of the reducing agent to form nitrogen oxides.

As regards the quantity of reducing agents in relation to the quantities of nitrogen oxides in the exhaust gases, this may vary in wide ranges. However, in the context of the present invention, particularly good results are obtained if the reducing agents, in particular ammonia and urea, are introduced into the exhaust-gas flow in such quantities that the molar ratio, in particular the equivalence ratio, between, on the one hand, the entirety of the reducing agent used and, on the other hand, nitrogen oxides to be reduced is set in the range from 1:1 to 5:1, in particular 2:1 to 4:1, preferably approximately 2.5:3.5. The equivalence ratio relates in this case to ammonia equivalents, which relate to the number of ammonia molecules or $NH_2$ radicals that the nitrogen-containing reducing agents that are used break down into. Accordingly, one molecule of urea corresponds to two ammonia equivalents, as one molecule of urea breaks down into two $NH_2$ radicals under thermolysis.

In the context of the present invention, particularly good results are obtained if, as reducing agent, at least two mutually different nitrogen-containing reducing agents, in particular ammonia and urea, are used. In this context, in the context of the present invention, it has proven to be expedient for the mutually different reducing agents to react with the nitrogen oxides under different reaction conditions, in particular at mutually different temperatures and/or under mutually different kinetic and/or thermodynamic conditions.

The mutually different reducing agents thus preferably differ not only in terms of their chemical composition but also in terms of their physical characteristics and/or their preferred reaction temperatures and reaction rates. In this way, it is possible, through targeted mixing of the at least two different reducing agents, to produce a new reduction reagent which can be adapted individually and flexibly to the respective application. Ideally, the reducing agents used differ in terms of their characteristics to such an extent that, by mixing them, an optimum range of action which is as broad as possible can be obtained.

As regards the introduction of the reducing agents into the nitrogen oxide-containing exhaust gases, it has proven to be advantageous if at least one reducing agent is used in the form of an aqueous solution. However, even better results are obtained if all reducing agents are used in the form of aqueous solutions. Through the use of aqueous solutions and the targeted variation of the concentrations of reducing agents in the respective solutions, the depth of penetration of the reducing agents into the exhaust-gas flow can be controlled in targeted fashion, whereby tailored and efficient use of the reducing agents is made possible.

It is preferably the case that ammonia, on the one hand, and urea, on the other hand, in particular in the form of their aqueous solutions, are used as mutually different reducing agents.

In SNCR methods of the prior art, use is normally made of either aqueous urea solution or ammonia water as reducing agent. For optimum nitrogen oxide separation with minimal ammonia slippage, the reducing agent must be mixed with the flue gases uniformly in the optimum temperature range. Here, to achieve the impetus for the complete mixing, a considerably greater expenditure of energy is required for ammonia water than for urea, because ammonia has a considerably higher vapor pressure.

Furthermore, aqueous solutions of urea and ammonia exhibit different reaction kinetics, this being based in particular on the fact that the urea dissolved in water can be split into reactive radicals only when the water surrounding the urea particles has completely evaporated, whereby a high depth of penetration into the exhaust gases is ensured with relatively little expenditure of energy.

By contrast, with the use of aqueous ammonia solutions, the ammonia evaporates from the individual water droplets immediately after entering the flue gases, such that the reaction takes place preferentially in the vicinity of the boiler walls. Thus, the partial pressure of ammonia reaches 1 bar at just 38° C. With the ammonia which is then present in gaseous form, the impetus required for the optimum depth of penetration of the reducing agents can, owing to the low mass in relation to a water droplet, be attained only by means of an increased expenditure of energy, for which purpose a corresponding steam or air flow rate must be considerably increased. In addition to the higher operating costs arising owing to the higher energy consumption, the investment costs for an installation operated with ammonia water are significantly higher owing to the safety requirements, as ammonia is a poisonous gas which is easily dissolvable in water at ambient temperature.

Ammonia water is therefore assigned to the water pollution class 2, and is furthermore, owing to the high potential risk to the environment, governed by the technical guidelines for steam boilers.

By contrast, owing to the chemical binding of ammonia in the urea molecule, urea solutions can be heated to 106° C. without ammonia gas evaporating out. The breakdown of urea into ammonia gas and carbon dioxide gas only begins at 130° C. and reaches a maximum at approximately 380° C. Since such high temperatures cannot be reached during storage, the safety provisions required for ammonia water are not necessary. Urea solution is, in accordance with the German Water Resources Act (WHG), assigned only to the water pollution class 1 (that is to say it must merely be ensured that urea cannot pass into the groundwater, for which purpose a collecting trough for the storage tank is adequate).

However, urea solutions have the disadvantage that, in the event of overdosing of urea, said urea is deposited in solid form on parts of the installation and leads to undesired corrosion. This is all the more true as installations for carrying out SNCR methods are installed relatively directly downstream of the combustion chambers, that is to say even upstream of the heat exchangers that are normally provided. At high loads or at high outputs of the combustion boiler, an injection of the urea solution into the region of the heat exchangers may be necessary in order to permit efficient reduction of the nitrogen oxides. This however harbors the risk of solid urea being deposited on the heat exchangers and thus leading to corrosion of the parts, reducing the service life of the installation and considerably increasing operating costs.

The use of ammonia solutions generally has the advantage that these can be obtained inexpensively on a large industrial scale, whereby the method according to the invention can be carried out at very low cost, and that ammonia readily evaporates out of the aqueous solution and reacts with the nitrogen oxides already close to the reactor wall. The latter advantage is however also a disadvantage, as it is often difficult or impossible with ammonia solutions to attain a depth of penetration into the flue-gas flow which permits efficient reduction of the nitrogen oxides.

By contrast, urea solutions have the advantage that, with these, a great depth of penetration into the flue-gas flow can be attained as the urea is broken down into $NH_2$ radicals, and can react with the nitrogen oxides, only after all of the water has been evaporated. On the other hand, however, with urea solutions, in particular when they are used in the vicinity of the heat exchangers, there is the risk of corrosion of installation parts.

Through a targeted combination of both of the above-mentioned reducing agents, in particular at respectively advantageous sites of action, it is however possible to avoid the respective disadvantages of the individual reducing agent and utilize the respective advantages in a targeted manner. This applies in particular if mixtures of ammonia and urea solutions are used.

If, in the context of the present invention, ammonia is used as one of the reducing agents, the ammonia is preferably provided and/or used in the form of an in particular aqueous solution with an $NH_3$ content of 10 to 35 wt %, in particular 15 to 30 wt %, preferably 20 to 30 wt %, preferably approximately 25 wt %.

If urea is used as one of the reducing agents for reducing the nitrogen oxide content of the exhaust gases, it has proven to be advantageous in the context of the present invention if the urea is provided and/or used in the form of an in particular aqueous solution with a urea content of 10 to 50 wt %, in particular 20 to 50 wt %, preferably 30 to 50 wt %, preferably 40 to 45 wt %, in relation to the solution.

It may likewise be provided that the aqueous urea solution or the aqueous ammoniacal solution has additional water added to it before introduction of the solution(s) into the exhaust-gas flow.

Both ammonia and urea solutions are commercially available in the abovementioned concentration ranges and are easy to store. The optional supplementary addition of further process water to the respective base mixtures permits targeted adjustment of the depth of penetration of the reducing agents into the flue gas and permits precise setting of the droplet size of the solutions of the reducing agents introduced into the exhaust-gas flow. This likewise has a positive influence on the reaction kinetics.

As regards the introduction of the reducing agents into the nitrogen oxide-containing exhaust gases, it may furthermore be provided that the mutually different reducing agents, in particular ammonia and urea, are introduced into the exhaust-gas flow temporally and/or spatially separately from one another.

It may however likewise be provided that the mutually different reducing agents are introduced into the exhaust-gas flow jointly, in particular after prior mixing.

In this case, for the most efficient and effective possible reduction of the nitrogen oxides in the exhaust gases, it has proven to be advantageous if, over the course of the method, the mutually different reducing agents are introduced into the flue-gas flow both temporally and/or spatially separately from one another and jointly after prior mixing.

The method according to the invention thus permits extremely flexible introduction of the reducing agents into the exhaust-gas flow, in particular flue-gas flow, in a manner adaptable to the respective method conditions. Here, it may be provided that, over the course of the method, the reducing agents are used individually or as mixtures, that is to say over the course of the method, there may preferably be alternation between the introduction of a single reducing agent and the introduction of mixtures of the reducing agents. In addition to this temporal separation of the introduction of the reducing agents or of the mixtures thereof, spatially separate introduction of the reducing agents or of the mixtures thereof is also possible. For this purpose, it may for example be the case that a single reducing agent is introduced at one location in the reactor, whereas the other reducing agent, or a mixture of reducing agents, is introduced at another location.

In the context of the present invention, if ammonia and urea are used as reducing agents, particularly good results can be obtained if ammonia and urea are introduced into the exhaust-gas flow in a weight-based ammonia/urea ratio of 99:1 to 1:99, in particular 95:5 to 5:95, preferably 9:1 to 1:9, preferably 7:1 to 1:7, more preferably 4:1 to 1:6, even more preferably 2:1 to 1:5. This applies in particular in the case of joint introduction of ammonia and urea. In the abovementioned ranges, particularly high efficiency in the denitrification of exhaust gases and a synergistic interaction between ammonia, on the one hand, and urea, on the other hand, can be observed, this being manifested not only in a considerable reduction of the nitrogen oxides but also in considerably lower consumption of reducing agents.

As also regards the ratio of the reducing agents with respect to one another that is used, it may be provided in the context of the present invention that the weight-based ratios of the reducing agents relative to one another, in particular the weight-based ratios of the mixture of the reducing agents, and/or the concentrations of the aqueous solutions of the reducing agents, are set identically for all injection planes, and/or are set individually for individual injection devices, in particular each injection device, and/or for groups of injection devices, preferably for each injection device.

The method according to the invention as discussed above permits, in relation to methods from the prior art, considerably improved reduction of the nitrogen oxides in exhaust gases, with a simultaneous reduction in the quantities of reducing agents used.

In the context of the present invention, particularly good results can be obtained if selective cooling of the exhaust gases is performed at the same time as and/or temporally prior to, in particular at the same time as, the introduction of the reducing agent into the exhaust-gas flow. In this context, it may be provided in particular that at least one coolant is introduced into and/or contacted with the flow of the exhaust gases.

In the context of the present invention, it may thus be provided that, at the same time as the denitrification, the exhaust gases from technical processes, in particular flue gases, are cooled. By means of the selective cooling of the exhaust gases, these are optimally prepared for the further exhaust-gas treatment. In particular, it is ensured that the exhaust-gas treatment, in particular the removal or separation of the nitrogen oxides from the exhaust gases, is performed in an optimum temperature range. The selective cooling of the flue gases is of significance in particular if existing combustion boilers are equipped with SNCR installations, because, in such combustion boilers, the structural circumstances, in particular the spacing between the combustion chamber itself and the heat exchangers, is often not optimal for the implementation of the SNCR method. It is thus for example often the case that the optimum temperature window for the introduction of the reducing agent into the exhaust-gas flow lies in the region of the heat exchangers or in some other only poorly accessible regions of the installation. By means of selective cooling of the exhaust gases, in particular flue gases, it is however possible for the temperatures in the exhaust-gas flow to be set such that the optimum temperature window for the denitrification of the flue gases is shifted into a region which is easily accessible for the introduction of reducing agents.

By means of the selective cooling of the exhaust gases, it is possible for even large temperature gradients, that is to say great temperature differences in the flue-gas flow, to be compensated, such that the nitrogen oxides can be removed or separated off from the flue gases in an efficient manner. In the context of the present invention, it is generally provided that the introduction of the coolant into the exhaust-gas flow causes the exhaust-gas flow to be cooled in its entirety or in regions. In this connection, it may be provided that the entire cross section of the exhaust-gas flow is cooled and/or that selected regions of the cross section, in particular perpendicular to the flow direction of the exhaust-gas flow, are cooled.

In the context of the present invention, the reference to cooling of the exhaust-gas flow "in regions" is to be understood to mean that, by means of the introduction of the coolant into the exhaust-gas flow, at least individual sections or regions of a plane running perpendicular to the flow direction of the exhaust gases are cooled.

Particularly good results with regard to the separating-off or removal of the nitrogen oxides from the exhaust gases are attained if the exhaust gases are cooled in particular at least in regions to temperatures in the range from 750 to 1200° C., in particular 800 to 1150° C., preferably 850 to 1100° C.

In this context, it may be provided that the entire cross section of the exhaust-gas flow is cooled and/or that selected regions of the cross section of the exhaust-gas flow are cooled.

A particularly good reaction of the reducing agents with the nitrogen oxides contained in the exhaust gases is attained in the temperature ranges mentioned above, such that in said temperature ranges, the rate of separation of the nitrogen oxides is particularly high, while at the same time the ammonia slippage and the reducing agent consumption are particularly low.

Cooling in regions to the abovementioned temperatures is given consideration in particular whenever parts of the exhaust-gas flow pass through a part of the installation which is poorly accessible owing to the structural design but in which the optimum temperature range for a reduction of the nitrogen oxides prevails. Said specific part of the exhaust gases can then be cooled in a targeted manner, and treated with reducing agents, before entering the poorly accessible or inaccessible regions, while the other regions of the exhaust-gas flow are not cooled and/or treated with reducing agents. As uniform a temperature profile of the exhaust-gas flow as possible is however always preferable, where possible.

In the context of the present invention, it is however generally provided that the cooling and thus the introduction of the coolant, in particular the introduction of cooling water, into the exhaust-gas flow is minimized, because the introduction of the coolant causes the efficiency, for example of combined heat and power plants, to be considerably impaired.

The coolant is normally a cooling liquid, in particular a non-ignitable and/or inert cooling liquid, preferably water. Water is generally preferable as cooling liquid or as coolant as it is cheap to obtain and is available in large amounts. Furthermore, water is already used in most SNCR methods for the dissolving of the reducing agents and/or for the setting of a specific content of reducing agents in the reducing agent solution. In the case of water being used as coolant, it is thus possible in principle to use the same water reservoir or the same installation parts for the supply of water as are used for the setting of the reducing agents.

In the context of the present invention, particularly good results are obtained if the coolant is introduced, in particular sprayed or injected, in finely distributed form into the exhaust-gas flow. Here, injection of the coolant has proven to be particularly efficient because, in a manner dependent on the design of the nozzles and a pressurization and throughflow rate coordinated therewith, a particularly optimum droplet spectrum and a flexibly adjustable depth of penetration of the coolant into the flue gases can be attained. The pressure required for the injection is in this case normally generated by means of compressed air or steam.

In the context of the present invention, the coolant is normally introduced into the exhaust-gas flow by means of injection devices, in particular injection lances. In this context, it has proven to be particularly advantageous if each injection device has one or more, in particular 1 to 20, preferably 1 to 15, preferably 1 to 10, particularly preferably 1 to 5, nozzles for introducing the coolant into the exhaust-gas flow. By means of a high number of nozzles, it is possible to realize a particularly uniform distribution of the coolant over the entire cross section of the exhaust-gas flow.

Particularly efficient cooling of the exhaust-gas flow is attained in particular if the injection devices are arranged in 1 to 10, in particular 1 to 7, preferably 1 to 5, preferably 1 to 3, injection planes, particularly preferably in one injection plane. For the majority of applications, it is adequate for one injection plane to be provided for the introduction of the coolant into the exhaust-gas flow. However, if it is not possible to obtain the desired temperature profile and/or the desired temperature reduction using only one injection plane, it is also possible for multiple injection planes to be provided, wherein, if appropriate, temperatures may be determined between the individual planes, and reducing agent may also be introduced into the flue-gas flow.

An arrangement of the injection devices in injection planes preferably perpendicular to the flow direction of the exhaust-gas flow permits a particularly uniform distribution of the coolant and thus particularly uniform cooling of the exhaust-gas flow. This arrangement may however be deviated from if, for example, it is sought to cool only a part of the exhaust-gas flow, for example if said region can subsequently no longer be reached by means of further injection devices, for example between the heat exchangers or heating surfaces of combustion boilers.

In this context, it may be provided that each injection plane has 1 to 20, in particular 1 to 15, preferably 1 to 12, injection devices. Likewise, it may also be provided that the coolant is introduced into the exhaust-gas flow by means of 1 to 200, in particular 1 to 100, preferably 1 to 60, preferably 1 to 36, particularly preferably 1 to 12, injection devices.

In the context of the present invention, particularly good results are obtained if the injection devices are controlled individually and/or in groups, preferably individually. In this context, it has proven to be expedient if the discharge of the coolant from the injection devices is controlled for each injection device individually and/or for groups of injection devices.

In this context, it has likewise proven to be expedient if the planes of sections and/or the planes of the exhaust-gas flow—as have been described above with regard to the determination of the temperature gradients—are assigned defined individual injection devices for introducing the coolant into the exhaust-gas flow and/or defined groups of injection devices for introducing the coolant into the exhaust-gas flow. The assignment of the injection devices for introducing the coolant to the above-defined sections or planes of sections makes it possible to ascertain the flue-gas speed between the individual sections on the basis of the determined temperature gradients and thus to carry out the improved method implementation according to the invention.

In the context of the present invention, it is generally provided that different injection devices are used for the coolant and for the reducing agent, in particular in different injection planes. In this way, in the context of the present invention, it is ensured that the cooling of the exhaust gases is performed, and/or can be regulated, independently of the injection or introduction of the reducing agent into the exhaust-gas flow.

In a particular embodiment of the present invention, it is provided that the coolant is introduced into the exhaust-gas flow such that a desired, in particular predefined, temperature profile of the exhaust-gas flow, in particular in at least one plane perpendicular to the flow direction of the exhaust-gas flow, is set. In this context, it may be provided that a uniform temperature profile, in particular with a uniform temperature and/or a narrow temperature interval, is set over the entire cross section of the exhaust-gas flow, and/or that a temperature profile with a non-uniform temperature distribution is set.

Furthermore, in the context of the present invention, it may be provided that the coolant and the reducing agent are introduced into the exhaust-gas flow in alternation and/or in a defined sequence, preferably in a spatially and/or temporally, preferably spatially, defined sequence. As regards the spatial sequence of the introduction of the reducing agent and of the coolant, it has proven to be advantageous if the coolant is first introduced into the exhaust-gas flow downstream of that injection device for introducing the reducing agent which is situated furthest upstream. It has been found that selective cooling of the flue gases upstream is often not necessary. Rather, much higher efficiency is achieved if, at the start of the exhaust-gas treatment, injection devices for introducing the reducing agent into the exhaust-gas flow are provided which are deactivated as necessary in the presence of excessively high temperatures. Further downstream, selective and at least regional cooling of the exhaust gases may then be performed if necessary, in particular in order to ensure a complete reaction of the nitrogen oxides in the exhaust gases with the reducing agent before they reach the heat exchanger. In this way, the coolant consumption, in particular the cooling water consumption, is minimized.

As regards the introduction of the coolant into the exhaust-gas flow, it has proven to be expedient if the introduction of the coolant into the exhaust-gas flow, in particular the quantity thereof and/or the time of the introduction, is regulated by means of an evaluation of the load signal and/or the determination of the temperature profiles of the exhaust-gas flow and/or the determination of the temperature gradients. In particular, in this context, it is preferred if the introduction of the coolant into the exhaust-gas flow is regulated by means of an evaluation of the load signal and by means of the determination of the temperature profiles of the exhaust-gas flow.

Particularly good results are obtained if the injection devices for introducing the coolant into the exhaust-gas flow are controlled, in particular individually or in groups, on the basis of the ascertained temperature profiles of the exhaust-gas flow and/or on the basis of the ascertained temperature gradients of the exhaust-gas flow and/or on the basis of the load signal.

Furthermore, in the context of the present invention, it has proven to be advantageous if the injection devices for introducing the coolant and the injection devices for introducing the reducing agent are controlled jointly on the basis of the ascertained temperature profiles of the exhaust-gas flow and/or on the basis of the ascertained temperature gradients of the exhaust-gas flow and/or on the basis of the load signal. In this context, particularly good results are obtained if the control of the injection devices for introducing the coolant and the control of the injection devices for introducing the reducing agent are coordinated with one another. In this way, particularly efficient reducing agent consumption can be achieved, wherein at the same time the quantity of coolant required is kept as low as possible.

Furthermore, in the context of the present invention, it may be provided that, in the measurement of the temperature profiles of the exhaust-gas flow, the distribution of nitrogen oxides, carbon monoxide and oxygen in the exhaust-gas flow is determined. Suitable measurement methods which permit ascertainment of the data are familiar to a person skilled in the art. On the basis of said data, the introduction of the reducing agent and/or the introduction of the coolant can be additionally regulated, wherein, in particular, the efficiency of the denitrification method can be further increased.

The method according to the invention, as presented above, permits a considerably improved reduction, in relation to methods from the prior art, of the nitrogen oxides in exhaust gases from technical processes, with a simultaneous reduction of the quantities of reducing agent and possibly coolant used and with considerably reduced ammonia slippage.

A further subject of the present invention—according to a second aspect of the present invention—is an apparatus (installation) for the treatment of nitrogen oxide-containing exhaust gases from technical processes, such as flue gases, for the purposes of removing and/or separating off the nitrogen oxides and/or for the purposes of reducing the nitrogen oxide content by means of chemical reduction of the nitrogen oxides, in particular an apparatus (installation) for the denitrification of exhaust gases from large technical installations, preferably for carrying out a method as described above, wherein the apparatus comprises:

(a) a reactor for contacting and/or reacting at least one reducing agent with the nitrogen oxide-containing exhaust gases, wherein the reactor has a multiplicity of injection devices, in particular injection lances, for the introduction, in particular injection, of at least one nitrogen-containing reducing agent, wherein the injection devices can be regulated individually and/or in groups, preferably individually, (b) measurement devices for ascertaining temperature profiles of the exhaust-gas flow, in particular for the purposes of controlling the introduction of the reducing agent into the exhaust-gas flow, and (c) at least one storage device, in particular a reservoir vessel, which is in particular assigned to the reactor and which is preferably connected via at least one feed line to the injection devices and which serves for storing and/or releasing at least one reducing agent.

As has already been discussed above in conjunction with the method according to the invention, it may be provided in the context of the present invention that the discharge of the reducing agent from the injection devices can be regulated for each injection device individually and/or for groups of injection devices.

Normally, each injection device for introducing the reducing agent into the exhaust-gas flow has one or more, in particular 1 to 20, preferably 1 to 15, preferably 1 to 10, particularly preferably 1 to 5, nozzles.

In this connection, it has proven to be advantageous if the apparatus has 1 to 200, in particular 2 to 100, preferably 5 to 60, injection devices for introducing the reducing agent into the exhaust-gas flow.

In the context of the present invention, particularly good results are obtained if the injection devices for introducing the reducing agent into the exhaust-gas flow are arranged in 1 to 10, in particular 1 to 7, preferably 1 to 5, injection planes. In this context, it has likewise proven to be expedient if each injection plane has 1 to 20, in particular 1 to 15, preferably 1 to 12, injection devices for introducing the reducing agent into the exhaust-gas flow.

In a preferred embodiment of the present invention, the injection devices are designed for introducing, in particular spraying, preferably injecting, aqueous solutions of the reducing agent, in particular aqueous ammonia and/or urea solutions.

In this context, it has proven to be advantageous if the apparatus comprises:

(c1) at least one first storage device, in particular a first reservoir vessel, which is in particular assigned to the reactor and which is preferably connected via at least one feed line to the injection devices and which serves for storing and/or releasing at least one first reducing agent, and (c2) at least one second storage device, in particular a second reservoir vessel, which is in particular assigned to the reactor and which is preferably connected via at least one feed line to the injection devices and which serves for storing and/or releasing at least one second reducing agent which differs from the first reducing agent.

It has likewise proven to be advantageous if the measurement devices are designed to determine the temperature profiles by means of acoustic or optical temperature measurement, preferably by means of acoustic temperature measurement.

Furthermore, in the context of the present invention, it may also be provided that the measurement devices for determining the temperature profiles are designed such that the distribution of nitrogen oxides, carbon monoxide and oxygen in the exhaust-gas flow can also be determined.

As furthermore regards the measurement devices, it is preferred in the context of the present invention if the measurement devices are arranged in at least two planes perpendicular to the flow direction of the exhaust gases. In this context, the measurement devices are preferably designed to determine the temperature profiles of the exhaust-gas flow in the form of planes, preferably perpendicular to the flow direction of the exhaust gases.

As regards the position of the measurement devices, in particular the position of the measurement devices in the reactor, said position may vary in wide ranges in a manner dependent on the respective structural circumstances. In the context of the present invention, however, particularly good results are obtained if the apparatus has, arranged downstream of the injection devices for introducing the reducing agent, at least one measurement device for determining the temperature distribution of the exhaust gases in the form of a plane. In the context of the present invention, therefore, a measurement device for determining the temperature distribution of the exhaust gases is, in the method direction, situated downstream of the injection devices for introducing the reducing agent and possibly downstream of the injection devices for introducing the coolant. Consequently, by means of said measurement device, the temperature distribution in the exhaust-gas flow after exhaust-gas treatment has been performed, in particular after denitrification has been performed, is determined.

Likewise, in the context of the present invention, it is preferred if the apparatus has, arranged upstream of the injection devices for introducing the reducing agent and/or downstream of the injection devices for introducing the reducing agent situated furthest upstream, at least one measurement device for determining the temperature distribution of the exhaust gases in the form of a plane. In the context of the present invention, it is preferred if a first determination of the temperature distribution of the exhaust gases is performed upstream of the injection devices for injecting the reducing agent or downstream of the injection devices situated furthest upstream, and thus, in the method direction, one or more planes with injection devices for introducing the reducing agent into the exhaust-gas flow are situated before a first measurement device for determining the temperature distribution in the exhaust-gas flow in the reactor. It has been found that, in particular when using acoustic measurement systems for determining the gas temperature, one temperature measurement plane is sufficient to obtain sufficient information for three injection planes for introducing the reducing agent.

In a preferred embodiment of the present invention, it is provided that the reactor has a multiplicity of injection devices, in particular injection lances, for introducing, in particular injecting, at least one coolant.

If the reactor has a multiplicity of injection devices for introducing at least one coolant, the apparatus generally has at least one storage device, in particular a reservoir vessel, which is in particular assigned to the reactor and which is preferably connected via at least one feed line to the injection devices and which serves for storing and/or releasing at least one coolant.

In the context of the present invention, particularly good results are obtained if the discharge of the coolant from the injection devices is regulable for each injection device individually and/or for groups of injection devices. In this way, a selective, that is to say spatially and temporally limited, introduction of coolant into the exhaust-gas flow can be realized.

As regards the design of the injection device for introducing the coolant, it has proven to be expedient if each injection device for injecting the coolant into the exhaust-gas flow has one or more, in particular 1 to 20, preferably 1 to 15, preferably 1 to 10, particularly preferably 1 to 5, nozzles.

Likewise, it is preferable if the injection devices for introducing the coolant into the exhaust-gas flow are arranged in 1 to 10, in particular 1 to 7, preferably 1 to 5, preferably 1 to 3, injection planes, particularly preferably in one injection plane. Here, particularly good results are obtained if each injection plane has 1 to 20, in particular 1 to 15, preferably 1 to 12, injection devices for introducing the coolant into the exhaust-gas flow.

It has been found that particularly good results are obtained if the injection devices for introducing the coolant are arranged in a plane which is arranged directly upstream of that injection plane for introducing the reducing agent which is situated furthest downstream. In this way, the temperatures for the final injection plane of the reducing agent can be once again optimally set, wherein at the same time, the coolant consumption is minimized and the efficiency of the heat exchangers and thus for example of a combined heat and power plant is only minimally impaired.

Furthermore, in the context of the present invention, good results are obtained if the apparatus has 1 to 200, in particular 1 to 100, preferably 1 to 60, preferably 1 to 36, particularly preferably 1 to 12, injection devices for introducing the coolant into the exhaust-gas flow.

In the context of the present invention, it is normally provided that the apparatus is connected downstream, in particular connected directly downstream, of a combustion device, in particular of a combustion boiler.

In this context, it has proven to be particularly advantageous if the apparatus is arranged between a combustion device and a heat-exchange device, and/or if the apparatus is connected downstream of a combustion device, in particular a combustion boiler, and extends into the region of a heat-exchange device. In particular if existing combustion boilers or heating boilers are equipped with the apparatus according to the invention, it may occur, owing to the temperature distribution and the structural circumstances, that the apparatus according to the invention, in particular the injection lances, are situated in the region of the heat-exchange device and/or the heating surfaces of the installation, for example of the large combustion installation.

Likewise, it has proven to be advantageous in the context of the present invention if the apparatus has at least one water storage device for storing and/or releasing water.

In this case, it may be provided in particular that the water storage device is assigned to the reactor and is preferably connected via at least one feed line to the injection devices for introducing the reducing agent.

Furthermore, in the context of the present invention, it is generally provided that the apparatus has at least one gas storage device for storing and/or releasing possibly compressed gases, in particular compressed air. In this context, it has proven to be advantageous if the gas storage device is assigned to the reactor and is preferably connected via at least one feed line to the injection devices for introducing the reducing agent into the exhaust-gas flow. Likewise, it may however also be provided that the apparatus has at least one gas storage device for storing and/or releasing possibly compressed gases, in particular compressed air, wherein in particular, the gas storage device is assigned to the reactor, and is preferably connected by means of at least one feed line to the injection devices for introducing the coolant into the exhaust-gas flow.

It is likewise generally provided according to the present invention that the pressurization of the injection devices for the purposes of discharging the coolant into the reactor can be performed by means of the gases stored in the gas storage device, and/or that the pressurization of the injection devices for the purposes of discharging the reducing agent into the reactor can be performed by means of the gases stored in the gas storage device.

In the context of the present invention, it may however also be provided that different gas storage devices or respectively separate gas storage devices are used for the discharge of the coolant and for the discharge of the reducing agent. This has no effect on the mode of operation of the apparatus according to the invention, but is solely due to the respective structural circumstances. Likewise, it is also possible for the same or separate control units to be used for controlling the pressurization for the discharging of the coolant and the discharging of the reducing agent.

In the context of the present invention, it has proven to be particularly advantageous if the apparatus has at least one dosing and/or mixing device.

In this context, it may be provided that the dosing and/or mixing device is connected to the storage devices for the provision of the reducing agent and to the injection devices for the provision of the reducing agent and to the injection devices for the introduction of the reducing agent into the exhaust-gas flow and to the water storage device that may be provided.

Furthermore, it may be provided that the dosing and/or mixing device is designed such that the concentrations of the aqueous solutions of the reducing agent can be regulated identically and/or can be individually regulated for individual injection devices, in particular for each injection device, for introducing the reducing agent into the exhaust-gas flow and/or for groups of injection devices for introducing the reducing agent into the exhaust-gas flow, preferably for each injection device for introducing the reducing agent into the exhaust-gas flow.

Furthermore, it has proven to be advantageous if the dosing and/or mixing device is designed such that the weight-based and/or volume-based ratios of the reducing agents relative to one another, in particular the weight-based and/or volume-based ratios of mixtures of the reducing agents, and/or the concentrations of the aqueous solutions of the reducing agents can be regulated identically and/or can be individually regulated for individual injection devices, in particular for each injection device, for introducing the reducing agent into the exhaust-gas flow and/or for groups of injection devices for introducing the reducing agent into the exhaust-gas flow, preferably for each injection device for introducing the reducing agent into the exhaust-gas flow.

In a preferred embodiment of the present invention, it is provided that the introduction of the coolant into the exhaust-gas flow can be controlled by means of an ascertainment of temperature profiles of the exhaust-gas flow and/or by means of an ascertainment of temperature gradients of the exhaust-gas flow and/or by means of a load signal.

In the context of the present invention, it has likewise proven to be expedient if the introduction of the reducing agent into the exhaust-gas flow is regulable by means of an ascertainment of temperature profiles of the exhaust-gas flow and/or by means of an ascertainment of temperature gradients of the exhaust-gas flow.

In this context, it has proven to be particularly expedient if the introduction of the reducing agent into the exhaust-gas flow is additionally regulable by means of a load signal and/or by means of a comparison between, on the one hand, a measured value for the residual nitrogen oxide content in the purified gas that results from the treatment and, on the other hand, a predefined setpoint value.

In the context of the present invention, particularly good results are obtained if the introduction of the reducing agent and the introduction of the coolant into the exhaust-gas flow can be coordinated with one another. In this way, in the context of the present invention, in particular in the context of the method implementation according to the invention, special synergistic effects can be obtained, in particular with regard to a high rate of separation of the nitrogen oxides out of the exhaust gases to be purified and a considerable reduction in reducing agent consumption, coolant consumption and ammonia slippage.

In a particular embodiment of the present invention, a temperature profile of the exhaust-gas flow can be set by means of the introduction of the coolant into the exhaust-gas flow. In this context, it may furthermore be provided that a uniform temperature profile or a non-uniform temperature profile of the exhaust-gas flow can be set.

As regards the setting of the temperatures as a result of the introduction of the coolant into the exhaust-gas flow, it has proven to be expedient in the context of the present invention if the exhaust-gas flow can be set to temperatures in the range from 750 to 1200° C., in particular 800 to 1150° C., preferably 850 to 1100° C., at least in regions, by means of the introduction of the coolant.

Furthermore, in the context of the present invention, it may be provided that the apparatus has devices for ascertaining a load signal and/or for ascertaining a value for the residual nitrogen oxide content in the purified gas that results from the treatment.

For further details relating to the apparatus or installation according to the invention, reference may be made to the above statements regarding the method according to the invention, which apply correspondingly with regard to the apparatus or installation according to the invention.

A further subject of the present invention—according to a third aspect of the present invention—is the use of an apparatus as described above for the treatment of nitrogen oxide-containing exhaust gases from technical processes, such as flue gases, for the purposes of removing and/or separating off the nitrogen oxides and/or for the purposes of reducing the nitrogen oxide content, in particular for the denitrification of exhaust gases from large technical installations.

For further details relating to this aspect of the invention, reference may be made to the above statements regarding the method according to the invention and/or regarding the apparatus according to the invention, which apply correspondingly regarding the use according to the invention.

The method according to the invention and the apparatus or installation according to the invention for the treatment of nitrogen oxide-containing exhaust gases from technical processes are illustrated by way of example, and in non-limiting fashion, in the appended figures.

Further advantages, characteristics, aspects and features of the present invention will emerge from the following descriptions of preferred embodiments according to the invention that are illustrated in the drawing.

Figure 2:
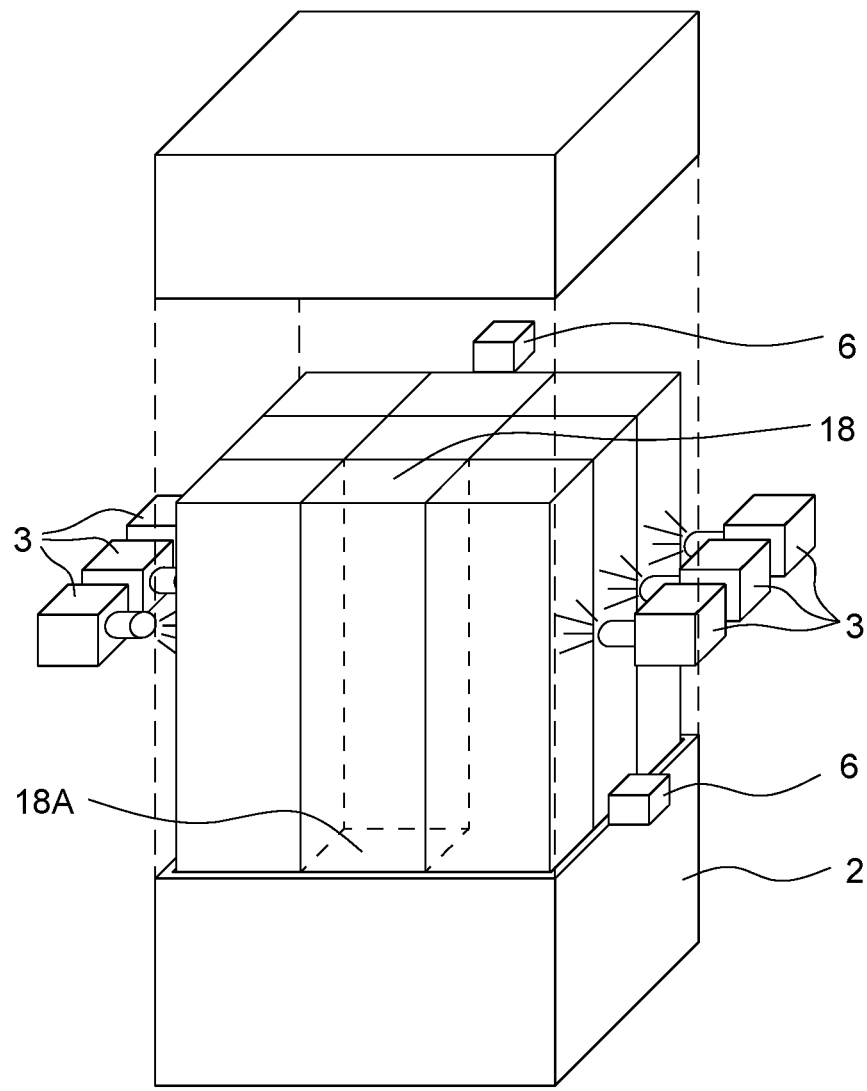
FIG. 2 is a perspective illustration of the reactor of the apparatus according to the invention.

In the drawing:

FIG. 1 is a schematic illustration of the apparatus according to the invention for carrying out a method according to the invention, FIG. 2 is a perspective illustration of the reactor of the apparatus according to the invention.

FIG. 1 is a schematic illustration of an apparatus 1 according to the invention for carrying out a method according to the invention.

The figure shows a reactor 2 for carrying out the method according to the invention for the treatment of nitrogen oxide-containing exhaust gases from technical processes, such as flue gases. The apparatus according to the invention is normally connected downstream of a combustion boiler 12, for example the combustion boiler of a large combustion installation such as a combined heat and power plant or a waste incineration installation, and is situated directly upstream of the heat exchangers or heating surfaces 13 at which the heat energy is extracted from the flue gases and supplied for further use.

The reactor 2 has a multiplicity of injection devices 3 for introducing a reducing agent into the reactor 2, wherein a greater or lesser number of injection planes may also be provided in a manner dependent on the respective circumstances. For illustrative purposes, the injection devices 3 are arranged in three planes. Furthermore, the reactor 2 has a multiplicity of injection devices 9 for introducing a coolant, in particular cooling water, into the reactor 2, wherein, in the figure, for illustrative purposes, the injection devices 9 are arranged in one injection plane. In the context of the present invention, the introduction of the cooling water by means of only one injection plane is preferred in order to keep the cooling water consumption as low as possible; it is however also possible for several injection planes to be provided in a manner dependent on the respective circumstances.

Furthermore, the reactor 2 has measurement systems for acoustic gas temperature measurement 6, which in the figure are arranged downstream of the injection devices 3 and 9 and downstream of that injection device 3 for introducing a reducing agent into the exhaust-gas flow which is situated furthest upstream. In the figure, two planes with measurement devices 6 are illustrated. Two planes with measurement devices 6 are normally required, but are also sufficient, to obtain sufficient information regarding the temperature distribution in the exhaust-gas flow. If a multiplicity of injection planes is provided, it is also possible for multiple planes of measurement devices 6 to be provided, because the acoustic measurement devices 6 normally provide sufficient information for the control of three injection planes.

By means of the measurement systems 6, it is possible to determine the temperature distribution in the exhaust-gas flow, in particular perpendicularly with respect to the flow direction of the exhaust gases, which runs from the combustion boiler 12 to the region of the heat exchangers 13. On the basis of the temperature distributions in the exhaust-gas flow as ascertained by means of the measurement systems 6, it is possible to determine temperature profiles or temperature gradients, in particular for individual sections of the exhaust-gas flow, such that the composition and the quantity and the location of introduction of the reducing agent 4, 5 introduced into the reactor 2, and the quantity and location of introduction of the coolant, can be set in targeted fashion. Furthermore, on the basis of the data obtained through the temperature measurement, it is also possible for the injection pressure and the droplet size to be set in targeted fashion in order to set the depth of penetration into the exhaust-gas flow.

The injection devices 3 for introducing the reducing agent into the exhaust-gas flow are connected via a feed line 15B to a reservoir vessel 15 for compressed air. Furthermore, the injection devices 3 are connected via the feed line 17 to a mixing apparatus 16 which is connected via the supply lines 7A and 8A to the reservoir vessels 7 and 8, which contain the reducing agents 4 (ammonia) and 5 (urea) in the form of their aqueous solutions. Furthermore, the mixing apparatus 16 is connected via the feed line 14A to a reservoir vessel 14 for water.

It may however also alternatively be provided not only that the reservoir vessels 7 and 8 for storing and releasing the reducing agent and the reservoir vessel 14 for storing and releasing water are connected to the mixing device 16 but also that the reservoir vessel 15 for releasing compressed air is connected to the mixing apparatus 16.

Furthermore, in a departure from the figure, the mixing device 16 may preferably be connected to the injection devices 3 not via only one supply line but via several. It is preferable if at least each injection plane of injection devices 3 is connected via at least one dedicated supply line to the mixing device 16. The best results are however obtained if each injection device is connected individually to be mixing device 16, such that the concentration of reducing agent can be set individually for each injection device 3. For the sake of clarity, however, a multiplicity of supply lines has not been shown in the figure.

Furthermore, the injection devices 9 for introducing the coolant into the exhaust-gas flow are connected via the feed line 11A to the reservoir vessel 11 for storing and releasing a coolant 10. The coolant 10 is preferably water.

As an alternative to the embodiment shown in the figure, the coolant 10 and the water, which in the figure is stored in reservoir vessel 14, may also be stored in and released from a vessel. This approach is however generally not preferred in practice because the cooling water may be normal service water or mains water, whereas, for the setting of the reducing agent content, use is normally made of fully desalinated water or deionized water, because otherwise, owing to the use of the base reducing agents ammonia and urea, salts such as limescale, for example, precipitate in the feed lines 17 and the injection devices 3, and these become blocked within a very short time.

Furthermore, in the context of the present invention, in a departure from the figure, it may be provided that, rather than two reducing agents, in particular aqueous ammonia solution and aqueous urea solution, only one reducing agent is provided. This duly reduces the efficiency of the method according to the invention but greatly simplifies the process control.

In the context of the method according to the invention, it is now preferably the case that a base setting for the dosing or metering of the reducing agent or of the reducing agents into the reactor 2 is selected on the basis of the load signal of the combustion boiler.

On the basis of the temperature distributions, ascertained by means of the measurement device 6, in planes perpendicular to the flow direction of the flue gases, the planes are divided into sections, and planes which follow one another and which are in particular aligned with one another are correlated with one another, such that three-dimensional regions are defined. Now, for said three-dimensional regions, in each case one temperature profile or one temperature gradient of the exhaust-gas flow is determined, from which the relative flue-gas speed can be ascertained. On the basis of the flue-gas speeds thus ascertained and the measured temperatures, the injection devices are controlled such that, firstly, for the introduction of the reducing agent, only injection devices 3 are used which can inject in an optimum temperature range for the reduction of the nitrogen oxides, and secondly, the reducing agent quantities emerging from the respective injection devices are adapted specifically to the $NO_x$ load in the respective sections. If necessary, in sections in which the flue-gas temperatures lie above the optimum temperatures for the denitrification, coolant 10 is selectively introduced by means of the injection devices 9, wherein the quantity of coolant 10 that is introduced is kept as low as possible in order that the heat transfer in the heat exchangers 13 is as efficient as possible.

It has been found that a single plane of injection devices 9 for introducing the cooling water into the exhaust-gas flow is often sufficient for providing, through selective cooling of the exhaust gases, an optimum temperature range for the reduction of the nitrogen oxides upstream of the point at which the flue gases enter the region of the heat exchangers 13.

Through the feed line 15A and 15B, compressed air is conducted to the respective injection devices 3 and 9, whereby the respective outlet pressure and thus the depth of penetration and droplet size of the reducing agent solution and of the coolant can be set in targeted fashion. It is however alternatively also possible for the pressure regulation to likewise be controlled by means of the measurement and dosing device 16 together with the respective mixing of the reducing agents.

The result of the denitrification according to the invention of the exhaust gases from technical processes is monitored by means of a comparison of the nitrogen oxide content of the purified gas that results from the exhaust-gas treatment with a predefined setpoint value. If necessary, the introduction of the reducing agents and/or of the coolant may be readjusted in the event of deviations between the actual value and the setpoint value.

FIG. 2 is a perspective illustration of the reactor 2, in which, for illustrative purposes, only a small number of injection devices 3 for introducing the reducing agent in only one injection plane into the exhaust-gas flow are illustrated.

It can also be seen from FIG. 2 how the measurement devices 6 define planes perpendicular to the flow direction of the exhaust gases, wherein, for the sake of clarity, only some of the measurement devices 6 are illustrated in the figure. The temperature distributions in the exhaust-gas flow in the form of planes, as obtained by means of the measurement devices 6 for acoustic determination of the gas temperature, are divided into sections, such as for example the sections 18 and 18A. Planes, which follow one another, of the temperature distributions in the exhaust-gas flow as ascertained by means of the measurement devices 6 for acoustic gas temperature measurement are, if they are in alignment with one another, correlated, like the sections 18 and 18A in the figure. In this way, three-dimensional regions are defined, for which one temperature profile and/or one temperature gradient can be determined. On the basis of the ascertained temperature gradient, it is possible to ascertain the relative flue-gas speed in the region between the sections 18 and 18A.

A determination of the relative flue-gas speeds is also possible if reducing agent is injected into the region between the sections 18 and 18A by means of the injection devices 3. The same also applies if coolant is injected into the exhaust-gas flow by means of the injection devices 9 for injecting coolant, in particular cooling water, which injection devices are not illustrated in the figure for the sake of clarity. Since the quantities of reducing agent and cooling water introduced into the region between the sections 18 and 18A are known, it is possible on the basis of the measured cooling and on the basis of the temperature gradients thus determined to ascertain the relative flue-gas speed in relation to the other sections. Here, sections with intense cooling are indicative of a low flue-gas speed and thus a low $NO_x$ load, such that only a small quantity of reducing agent has to be injected into the regions between such sections. By contrast, only small temperature changes between the sections 18 and 18A are indicative of a high flue-gas speed, such that a relatively large quantity of reducing agent has to be injected into the corresponding region between the sections 18 and 18A.

The method according to the invention therefore permits very fast adaptive control of the introduction of reducing agent and possibly coolant into the exhaust-gas flow on the basis of the flue-gas speeds.

Further configurations, modifications, variations and special features of the present invention are readily apparent to a person skilled in the art reading the description, and can be realized without departing from the scope of the present invention.

The present invention will be demonstrated on the basis of the following exemplary embodiments, without the present invention however being restricted to these.

Exemplary Embodiments

To show the effectiveness of the method according to the invention and of the apparatus according to the invention, the subject of the present invention will be explained by way of example on the basis of the following exemplary embodiments.

According to the invention, the method is carried out using an apparatus such as is illustrated schematically and by way of example in the figures.

The method according to the invention for the reduction of nitrogen oxides from flue gases will be demonstrated on the basis of a mineral coal-fired boiler from the prior art at full load (225 $MW_{el}$). The boiler has a capacity of 650 t/h and the $NO_x$ baseline, that is to say the $NO_x$ load without exhaust-gas treatment, is 300 to 340 $mg/Nm^3$ ($Nm^3$=standard cubic meters).

The $NO_x$ emissions should be kept at a daily average of less than 190 $mg/Nm^3$, and ammonia slippage should amount to less than 3.5 $mg/Nm^3$.

An apparatus according to the invention for reducing the nitrogen oxide content of flue gases is fitted between the boiler and the heat exchangers of the installation. The apparatus according to the invention is composed of a reaction chamber in which ammonia water (25 wt % $NH_3$ in relation to the ammonia water), urea solution (40 wt % urea in relation to the solution) and mixtures of the two liquids are injected by means of three injection planes each with 12 injection lances, that is to say by means of a total of 36 injection lances.

A measurement device for determining the temperature distribution in the cross section of the exhaust-gas flow by means of acoustic gas temperature measurement is arranged downstream of the first injection plane for introducing the reducing agent. Said measurement device is followed, downstream, by a further injection plane for introducing the reducing agent, which further injection plane is followed by an injection plane with 10 injection lances for introducing cooling water into the exhaust-gas flow. Downstream of the injection plane for introducing the coolant, there is arranged a final injection plane for introducing reducing agent into the exhaust-gas flow.

The final injection plane for introducing reducing agents into the exhaust-gas flow is followed, downstream, by a further measurement device for determining the gas temperature by means of acoustic gas temperature measurement.

In each case upon the commencement of the method and/or at regular intervals over the duration of the method, the nitrogen oxide load of the untreated gas, that is to say of the exhaust gas that has not yet undergone treatment, is measured in order to thereby permit, in combination with the load signal, a coarse setting of the exhaust-gas treatment device, in particular with regard to the injection of the reducing agent and of the coolant.

Throughout the further duration of the method, the nitrogen oxide load of the treated exhaust gases, that is to say of the purified gases, and the ammonia slippage are determined, whereby monitoring and readjustment of the method according to the invention are made possible. The fine adjustment of the method according to the invention, in particular the quantity of coolant and/or reducing agent introduced into the exhaust-gas flow by means of the respective injection devices, which are all individually switchable, and decision-making regarding which injection devices are actually used for the injection, are performed on the basis of the respectively ascertained temperature distributions in the exhaust-gas flow and on the basis of the temperature gradients of the exhaust-gas flow.

For comparison, the method is repeated with the temperature distribution in the exhaust-gas flow being determined only by means of the lower measurement device, that is to say the measurement device situated upstream. This method implementation corresponds, in terms of arrangement and execution, to an advanced SNCR method from the prior art. In said method from the prior art, the fine adjustment of the exhaust-gas treatment device is performed by means of the comparison of the nitrogen oxide load of the treated exhaust gases (that is to say of the purified gases) and of the ammonia slippage with the respective setpoint values.

In each case a total of three different method sequences are tested, which differ by the fact that either only ammonia or only urea or mixtures of ammonia and urea are used as reducing agent.

The results of the method runs are summarized in table 1.

As can be seen from the data from table 1, it is readily possible with the method according to the invention to adhere to the target value of a daily average of less than 190 $mg/Nm^3$. In the case of the method not conforming to the invention, it can be seen that an injection of ammonia alone as reducing agent is not sufficient to adhere to the demanded limit value. It can however be seen that much better values regarding the ammonia slippage can be achieved with the method according to the invention. Furthermore, by means of the method implementation according to the invention, a considerable reduction in reducing agent consumption can be achieved, that is to say the denitrification of flue gas is made much more efficient by means of the method according to the invention, because fewer resources are used.

The same also applies to the total water consumption according to the method implementation according to the invention in relation to the method implementation not conforming to the invention. Here, very considerable differences can be seen between the adaptive flue-gas denitrification according to the invention, which can react simultaneously to the changes in the flue-gas flow, and methods from the prior art, in which control of the introduction of the quantities of reducing agent and cooling water is controlled by means of a comparison of the measured nitrogen oxide load of the purified gas with a setpoint value.

It can furthermore be seen that, by means of the method implementation according to the invention, both the process water consumption in the injection of the reducing agent and also the cooling water consumption can be considerably reduced in relation to the prior art, such that the total water consumption can be lowered by approximately 70%. Furthermore, it can also be seen both that the ammonia slippage can be reduced by approximately 20 to 30%, and the reducing agent consumption can be reduced by approximately 10%.

TABLE 1

Comparison of the method according to the invention and methods from the prior art

|  | Method implementation according to the invention | | | Method implementation not conforming to the invention | | |
| --- | --- | --- | --- | --- | --- | --- |
| Reducing agent | $NH_3$ | Urea | $NH_3$/urea | $NH_3$ | Urea | $NH_3$/urea |
| Ratio $NH_3$:urea | 100% $NH_3$ | 100% urea | 1:99 to 99:1 | 100% $NH_3$ | 100% urea | 1:99 to 99:1 |
| $NO_x$ untreated gas [mg/Nm³] | 334 | 324 | 335 | 328 | 318 | 337 |
| $NO_x$ purified gas [mg/Nm³] | 187 | 183 | 156 | 198 | 186 | 173 |
| $\Delta NO_x$ [mg/Nm³] | 147 | 141 | 179 | 130 | 132 | 164 |
| $NH_3$ slippage [mg/NM³] | 3.4 | 3.2 | 2.9 | 5.3 | 4.3 | 3.2 |
| Reducing agent consumption [kg/h] | 732 | 692 | 676 | 812 | 768 | 751 |
| Cooling water consumption [l/h] | 2650 | 1370 | 1500 | 4290 | 3800 | 3650 |
| Process water consumption [l/h] | 2380 | 1620 | 1840 | 8390 | 4830 | 6350 |
| Total water consumption [l/h] | 5030 | 2990 | 3340 | 12 680 | 8630 | 10 000 |

LIST OF REFERENCE DESIGNATIONS

1 Apparatus
2 Reactor
3 Injection device for introducing the reducing agent
4 Reducing agent, $NH_3$
5 Reducing agent, urea
6 Measurement devices
7 Storage device, $NH_3$
7A Feed line, $NH_3$
8 Storage device, urea
8A Feed line, urea
9 Injection device for introducing the coolant
10 Coolant
11 Storage device, coolant
11A Feed line, coolant
12 Combustion boiler
13 Heat exchanger
14 Storage device, water
14A Feed line
15 Storage device, compressed air
15A Feed line, compressed air
15B Feed line, compressed air
16 Mixing device
17 Feed line
18 Section
18A Section

The invention claimed is:

1. A method for the treatment of nitrogen oxide-comprising exhaust gases from technical processes for the purpose of, denitrification of the exhaust by means of chemical reduction of the nitrogen oxides,
    wherein at least one nitrogen-comprising reducing agent is introduced into the flow of the nitrogen oxide-comprising exhaust gases, wherein the quantity of the reducing agent introduced into the exhaust-gas flow is adjusted in a manner dependent on the exhaust-gas speed,
    wherein, for the determination of the exhaust-gas speed, at least one of (i) a temperature profile and (ii) a temperature gradient of the exhaust-gas flow is established at least in regions, and the relative speed of the exhaust-gases is determined on the basis of the temperature profiles or the temperature gradients in the exhaust-gas flow,
    wherein, in the exhaust-gas flow, planes of sections or measurement regions are defined in each case perpendicularly with respect to the flow direction of the exhaust gases and are correlated with one another, wherein the planes of the sections or measurement regions extend in each case perpendicularly with respect to the flow direction of the exhaust gases and parallel to one another and wherein the planes of the sections or measurement regions are, in the flow direction of the exhaust gases, arranged in alignment with one another and arranged following one another and in alignment with one another, and wherein the exhaust-gas temperature is determined in each case in the respective correlated planes and wherein, on the basis of the determined exhaust-gas temperatures of the respective planes, temperature profiles or temperature gradients in the exhaust-gas flow in the respective correlated planes are determined, and wherein, on the basis of the temperature profiles or of the temperature gradients in the exhaust-gas flow the relative speed of the exhaust gases is determined.

2. The method as claimed in claim 1,
wherein, for the determination of the temperature profiles and of the temperature gradients, the temperatures of the exhaust-gas flow in at least two planes are determined.

3. The method as claimed in claim 1,
wherein the determination of the temperature profiles and of the temperature gradients is performed by means of acoustic or optical temperature measurement.

4. The method as claimed in claim 1,
wherein the reducing agent is introduced into the exhaust-gas flow such that the reducing agent reacts with the nitrogen oxides to form elementary nitrogen.

5. The method as claimed in claim 1,
wherein the reducing agent used is in the form of an aqueous solution.

6. The method as claimed in claim 1,
wherein the reducing agent is selected among at least one of ammonia and urea.

7. The method as claimed in claim 1,
wherein the reducing agent is introduced into the exhaust-gas flow by means of injection devices, wherein each injection device has one or more nozzles for introducing the reducing agent into the exhaust-gas flow.

8. The method as claimed in claim 1,
wherein the injection devices for introducing the reducing agent into the exhaust-gas flow are arranged in 1 to 10 injection planes, wherein each injection plane comprises 1 to 20 injection devices.

9. The method as claimed in claim 1,
wherein the temperatures of the exhaust-gas flow at least in a first plane upstream of the injection devices for introducing the reducing agent and in the region of the injection devices for introducing the reducing agent are determined and wherein the temperatures of the exhaust-gas flow at least in a second plane downstream of the injection devices for introducing the reducing agent are determined.

10. The method as claimed in claim 1, wherein the reducing agent is introduced, in particular sprayed or injected, in finely distributed form into the exhaust-gas flow.

* * * * *